United States Patent
Ishida et al.

(10) Patent No.: US 7,925,063 B2
(45) Date of Patent: Apr. 12, 2011

(54) APPARATUS AND METHOD FOR FINGERPRINT AUTHENTICATION, PORTABLE TERMINAL DEVICE, AND RECORDING MEDIUM

(75) Inventors: Makoto Ishida, Kawasaki (JP); Toshinori Yoshitsuru, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 958 days.

(21) Appl. No.: 11/425,451

(22) Filed: Jun. 21, 2006

(65) Prior Publication Data

US 2008/0113685 A1    May 15, 2008

(30) Foreign Application Priority Data

Mar. 3, 2006  (JP) .................................. 2006-058121

(51) Int. Cl.
*G06K 9/00*  (2006.01)
(52) U.S. Cl. ..... 382/124; 340/5.83; 382/278; 455/550.1
(58) Field of Classification Search ................ 340/5.82, 340/5.83; 382/115, 124, 278; 455/556.1, 455/556.2, 566, 90.3, 550.1, 575.3
See application file for complete search history.

(56) References Cited

U.S. PATENT DOCUMENTS

| | | | |
|---|---|---|---|
| 6,636,144 B1 | 10/2003 | Hirakawa | |
| 7,050,609 B2* | 5/2006 | Huang | 382/124 |
| 7,110,579 B2* | 9/2006 | Hashimoto | 382/124 |
| 7,289,824 B2* | 10/2007 | Jerbi et al. | 455/556.1 |
| 7,366,497 B2* | 4/2008 | Nagata | 455/410 |
| 7,376,449 B2* | 5/2008 | Mizuta et al. | 455/575.3 |
| 2001/0040988 A1* | 11/2001 | Takahashi | 382/124 |
| 2002/0180585 A1* | 12/2002 | Kim et al. | 340/5.53 |
| 2003/0062490 A1* | 4/2003 | Fujieda | 250/556 |
| 2004/0264747 A1* | 12/2004 | Hata | 382/124 |
| 2005/0041841 A1 | 2/2005 | Yoo et al. | |
| 2005/0226477 A1* | 10/2005 | Tanaka | 382/124 |
| 2005/0270140 A1* | 12/2005 | Oh | 340/5.83 |
| 2006/0023921 A1* | 2/2006 | Saitoh et al. | 382/115 |
| 2006/0047970 A1* | 3/2006 | Mochizuki | 713/186 |
| 2006/0120577 A1* | 6/2006 | Shinzaki et al. | 382/124 |
| 2006/0165264 A1* | 7/2006 | Saitoh et al. | 382/115 |

(Continued)

FOREIGN PATENT DOCUMENTS

EP    1 063 605    12/2000

(Continued)

OTHER PUBLICATIONS

Korean Office Action dated Jul. 26, 2007 issued in the corresponding Korean Patent Application 10-2006-0059555.

(Continued)

*Primary Examiner* — Gregory M Desire
(74) *Attorney, Agent, or Firm* — Staas & Halsey LLP

(57) ABSTRACT

The present invention relates to finger authentication and improves a fingerprint authenticating function by excluding errors caused depending on detection forms. When a fingerprint is detected, form data representing the detection form are captured and, when inputted fingerprint data are compared with registered fingerprint data, authentication is executed referring to the form data. Thereby, the errors caused depending on the detection forms can be excluded and the fingerprint authenticating function is improved. A plurality of different detection form of fingerprint data are registered, a comparison target is selected from the fingerprint data, and the comparison target is compared with the inputted fingerprint data. Thereby, the fingerprint authenticating function is improved. To match the detection form, the apparatus may be configured to compare the registered fingerprint data with the inputted fingerprint data rotating either thereof and, thereby, similarly, the fingerprint authenticating function can be improved.

17 Claims, 23 Drawing Sheets

U.S. PATENT DOCUMENTS

2007/0299322 A1* 12/2007 Miyajima et al. .............. 600/301

FOREIGN PATENT DOCUMENTS

| EP | 1 063 616 | 12/2000 |
|----|-----------|---------|
| JP | 2000-270385 | 9/2000 |
| JP | 2000-293688 | 10/2000 |
| JP | 2001-005959 | 1/2001 |
| JP | 2001-307093 | 11/2001 |

OTHER PUBLICATIONS

Japanese Office Action mailed Dec. 7, 2010 in corresponding Japanese Application No. 2006-058121.

* cited by examiner

APPARATUS AND METHOD FOR FINGERPRINT AUTHENTICATION, PORTABLE TERMINAL DEVICE, AND RECORDING MEDIUM

CROSS-REFERENCE TO RELATED APPLICATIONS

This application is based upon and claims the benefit of priority from the prior Japanese Patent Application No. 2006-58121, filed on Mar. 3, 2006, the entire contents of which are incorporated herein by reference.

BACKGROUND OF THE INVENTION

1. Field of the Invention

The present invention relates generally to fingerprint authentication that can be used for a portable telephone, etc., that has a fingerprint authenticating function, and more particularly to a fingerprint authenticating apparatus, a fingerprint authenticating method, a fingerprint authenticating program, and a portable terminal device that can cope with variation of relative positions of a fingerprint detecting unit and a finger to detect the fingerprint thereof.

2. Description of the Related Art

As portable terminal devices such as portable telephones, etc., those having a fingerprint authentication function for identifying users thereof prevail. As to such fingerprint authentication, Japanese Patent Application Laid-Open Publication No. 2000-270385 discloses an apparatus that includes authentication input means in the main body thereof, and extracts characteristics of a fingerprint image received from the fingerprint input means and checks whether or not the extracted fingerprint characteristics are present in registered fingerprint characteristics.

The fingerprint authentication is executed by checking whether or not inputted fingerprint information is present in the registered fingerprint information. Therefore, when the inputted fingerprint information does not coincide with the registered fingerprint information, the fact that a person is the principal can not be confirmed. For an apparatus configured to, for example, be able to be opened and closed by connecting two (2) housing units with a hinging unit such as a portable telephone, an inputted form of a fingerprint into the fingerprint detecting unit differs between those for the time when a fingerprint is inputted from the housing units that are opened and for the time when the fingerprint is inputted from the housing units that are closed, though a fingerprint detecting unit is installed in a specific position. Therefore, because a detected pattern is varied according to these forms of use, inconvenience that the authentication takes time may be expected when authentication detection rate is lowered. Therefore, the user may feel inconvenience that the user has to pay attention to the direction of his/her finger against the fingerprint detecting unit or the direction in which the finger is placed, etc.

Japanese Patent Application Laid-Open Publication No. 2000-270385 discloses or suggests nothing as to this problem and discloses or suggests no configuration to solve the problem.

SUMMARY OF THE INVENTION

An object of the present invention is to improve a fingerprint authentication function by excluding errors caused depending on detection forms as to fingerprint authentication.

An other object of the present invention is to provide a portable terminal device for which the fingerprint authentication function has been improved.

To achieve the above objects, according to the present invention, errors caused by detection forms can be excluded and the fingerprint authentication function can be improved by, when a fingerprint is detected, capturing form data representing the detection form of the fingerprint and, when inputted fingerprint data and registered fingerprint data are compared with each other, executing authentication referring to the form data.

To achieve the above objects, according to the present invention, the fingerprint authentication function can be improved by registering a plurality of fingerprint data for different detection forms, selecting a comparison target from the fingerprint data, and comparing the comparison target with the inputted fingerprint data. To match the detection form, the apparatus may be configured to compare the registered fingerprint data with the inputted fingerprint data rotating either thereof and, thereby, similarly, the fingerprint authentication function can be improved.

In order to achieve the above objects, according to a first aspect of the present invention there is provided a fingerprint authenticating apparatus comprising a fingerprint sensor unit that detects a fingerprint; a form detecting unit that detects a detection form of the fingerprint to the fingerprint sensor unit; a registering unit that registers fingerprint data representing the fingerprint detected by the fingerprint sensor unit; and a comparing unit that compares registered data of the registering unit and inputted data obtained from the fingerprint sensor unit with each other, referring to the detection form. According to such a configuration, the authentication precision can be improved and the authentication function can be improved because the data are corrected using form data that represent the detection form of either of the inputted data or the registered data, in an authenticating process.

In the fingerprint authenticating apparatus, the fingerprint data and form data representing the detection form may be registered in the registering unit, being correlated with each other.

In order to achieve the above objects, according to the present invention there is provided a fingerprint authenticating apparatus comprising a fingerprint sensor unit that detects a fingerprint; a registering unit that registers a plurality of different forms of fingerprint data detected by the fingerprint sensor unit; and a comparing unit that selects a comparison target from the plurality of sets of registered data in the registering unit and compares the comparison target with inputted data obtained from the fingerprint sensor unit.

The fingerprint authenticating apparatus may comprise a displaying unit that displays a message; and a processing unit that causes the displaying unit to display a message representing a detection form of a fingerprint to the fingerprint sensor unit, and causes the registering unit to register a plurality of sets of fingerprint data obtained from the fingerprint sensor unit.

In order to achieve the above objects, according to the present invention there is provided a fingerprint authenticating apparatus comprising a fingerprint sensor unit that detects a fingerprint; a registering unit that registers fingerprint data representing the fingerprint detected by the fingerprint sensor unit; and a comparing unit that corrects registered data of the registering unit or inputted data obtained from the fingerprint sensor unit into a detection form, and compares the registered data and the inputted data with each other.

In order to achieve the above objects, according to a second aspect of the present invention there is provided a fingerprint authenticating method comprising the steps of detecting a fingerprint; detecting a detection form of the fingerprint; registering fingerprint data representing the fingerprint detected; and comparing registered data and inputted data with each other, referring to the detection form.

The fingerprint authenticating method may comprise step of registering the fingerprint data and form data representing the detection form, being correlated with each other.

In order to achieve the above objects, according to the present invention there is provided a fingerprint authenticating method comprising the steps of detecting a fingerprint; registering a plurality of different forms of fingerprint data detected by a fingerprint sensor unit into a registering unit; and selecting a comparison target from the plurality of sets of registered data in the registering unit, and comparing the comparison target with inputted data obtained from the fingerprint sensor unit.

The fingerprint authenticating method may comprise the step of displaying a message representing a detection form of the fingerprint.

In order to achieve the above objects, according to the present invention there is provided a fingerprint authenticating method comprising the steps of detecting a fingerprint; registering fingerprint data representing the fingerprint; and correcting registered data or inputted data into a detection form, and comparing the registered data and the inputted data with each other.

In order to achieve the above objects, according to a third aspect of the present invention there is provided a fingerprint authenticating program executed by a computer, the program including the steps of detecting a fingerprint; detecting a detection form of the fingerprint; registering fingerprint data representing the fingerprint detected; and comparing registered data and inputted data with each other, referring to the detection form.

The fingerprint authenticating program may include the step of registering the fingerprint data and form data representing the detection form, being correlated with each other.

In order to achieve the above objects, according to the present invention there is provided a fingerprint authenticating program executed by a computer, the program including the steps of detecting a fingerprint; registering a plurality of different forms of fingerprint data detected by a fingerprint sensor unit into a registering unit; and selecting a comparison target from the plurality of sets of registered data in the registering unit, and comparing the comparison target with inputted data obtained from the fingerprint sensor unit.

The fingerprint authenticating program may include the step of displaying a message representing a detection form of the fingerprint.

In order to achieve the above objects, according to the present invention there is provided a fingerprint authenticating program executed by a computer, the program including the steps of detecting a fingerprint; registering fingerprint data representing the fingerprint; and correcting registered data or inputted data into a detection form, and comparing the registered data and the inputted data with each other.

In order to achieve the above objects, according to a fourth aspect of the present invention there is provided a portable terminal device comprising a fingerprint sensor unit that detects a fingerprint; a form detecting unit that detects a detection form of the fingerprint to the fingerprint sensor unit; a registering unit that registers fingerprint data representing the fingerprint detected by the fingerprint sensor unit; and a comparing unit that compares registered data of the registering unit and inputted data obtained from the fingerprint sensor unit with each other, referring to the detection form. According to such a configuration, the authentication precision can be improved and a portable terminal device for which the authentication function is improved can be realized because the data are corrected using form data that represent the detection form of either of the inputted data or the registered data, in an authenticating process.

In the portable terminal device, the fingerprint data and form data representing the detection form may be registered in the registering unit, being correlated with each other.

In order to achieve the above objects, according to the present invention there is provided a portable terminal device including a fingerprint sensor unit that detects a fingerprint; a registering unit that registers a plurality of different forms of fingerprint data detected by the fingerprint sensor unit; and a comparing unit that selects a comparison target from the plurality of sets of registered data in the registering unit and compares the comparison target with inputted data obtained from the fingerprint sensor unit.

The portable terminal device may comprise a displaying unit that displays a message; and a processing unit that causes the displaying unit to display a message representing a detection form of a fingerprint to the fingerprint sensor unit, and causes the registering unit to register a plurality of sets of fingerprint data obtained from the fingerprint sensor unit.

In order to achieve the above objects, according to the present invention there is provided a portable terminal device comprising: a fingerprint sensor unit that detects a fingerprint; a registering unit that registers fingerprint data representing the fingerprint detected by the fingerprint sensor unit; and a comparing unit that corrects registered data of the registering unit or inputted data obtained from the fingerprint sensor unit into a detection form, and compares the registered data and the inputted data with each other.

The characteristics and advantages are listed as follows.

(1) Authentication errors caused depending on the form of use can be reduced and the authentication function can be improved because detection information that represents the detection form of a fingerprint is referred to in the authenticating process.

(2) When the authenticating process of referring to the detection information that represent the detection form of a fingerprint is employed in a portable terminal device such as a portable telephone, etc., the fingerprint authentication precision can be improved and a portable terminal device for which the authentication function is improved can be realized.

The above and other objects, aspects, features, and advantages of the present invention will become more apparent from the following detailed description of the embodiments with reference to the accompanying drawings.

DETAILED DESCRIPTION OF THE PREFERRED EMBODIMENTS

First Embodiment

Figure 1:
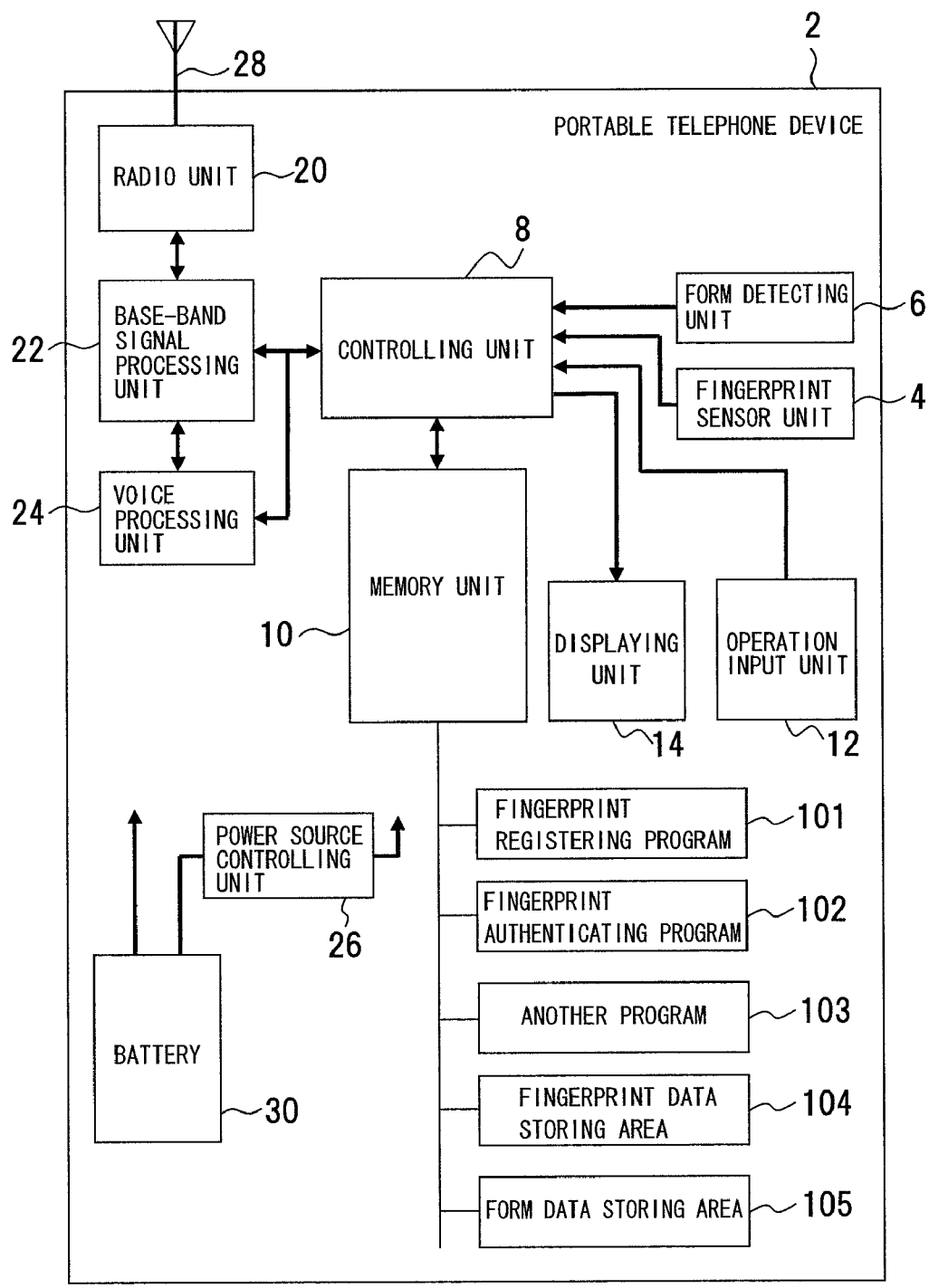
FIG. 1 is a block diagram showing an example of the configuration of a portable telephone device of a first embodiment.
Figure 2:
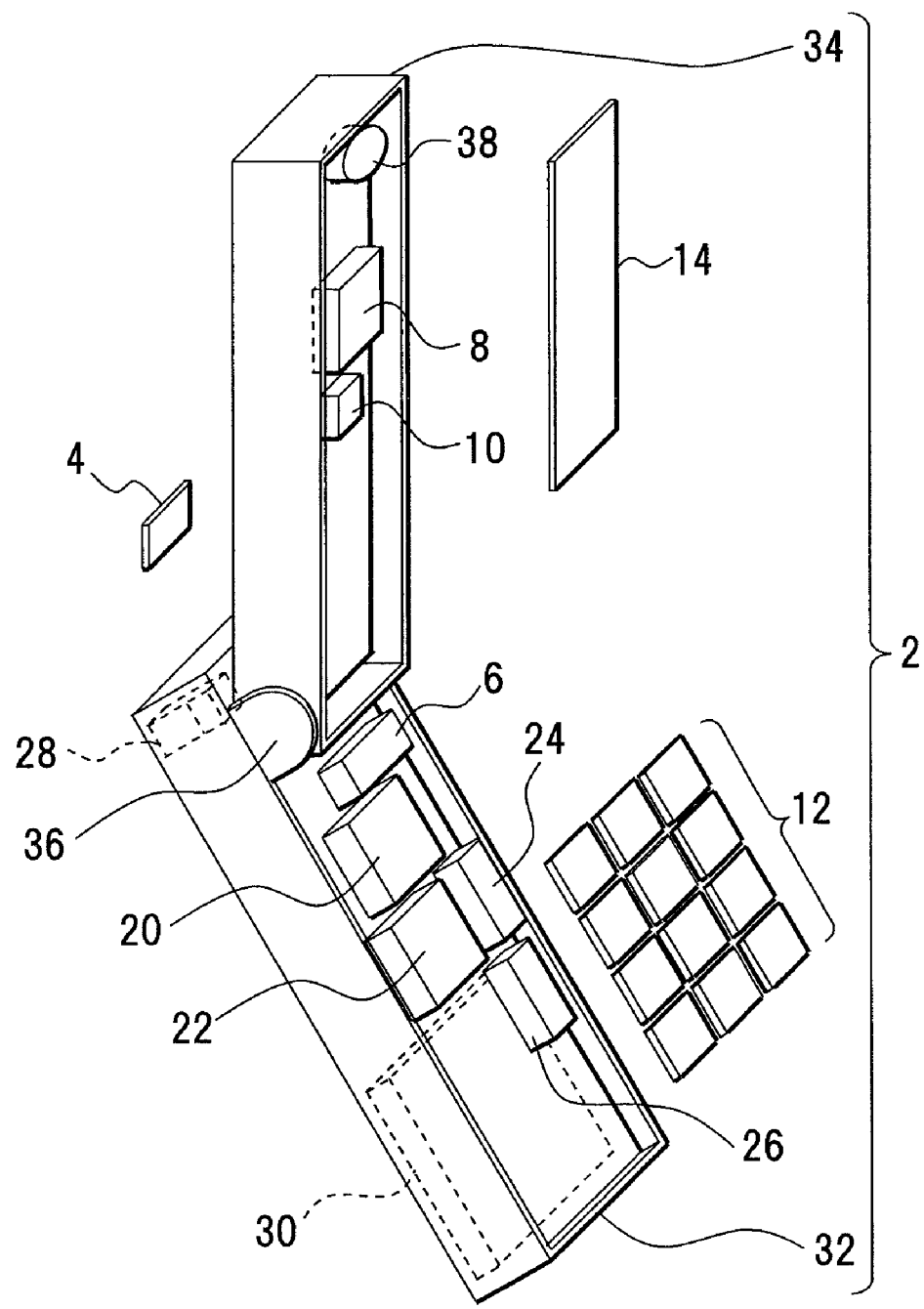
FIG. 2 is a perspective view showing an example of the configuration of functional units of the portable telephone device.

A first embodiment of the present invention will be described with reference to FIGS. 1 and 2. FIG. 1 is a block diagram showing an example of the configuration of a portable telephone device. FIG. 2 is a perspective view showing an example of the configuration of functional units of the portable telephone device. In FIGS. 1 and 2, the same units are given the same reference numerals. This portable telephone device is an example of a fingerprint authenticating apparatus or a portable terminal device, and the present invention is not limited to the portable telephone device.

A portable telephone device 2 is an example of an electronic apparatus or a portable terminal device that includes a fingerprint authenticating apparatus or a fingerprint authenticating apparatus. This portable telephone device 2 includes a fingerprint authenticating function that authenticates whether a person is the principal or another person using a fingerprint of the person. This fingerprint authenticating function is realized by a fingerprint sensor unit 4, a form detecting unit 6, a controlling unit 8, a memory unit 10, a operation input unit 12, a displaying unit 14, etc. The fingerprint sensor unit 4 is an input unit for fingerprints and detects fingerprints inputted by means of contact, etc., of fingers of users. Due to this detection, fingerprint pattern data or characteristics data that a fingerprint has can be obtained and these data are referred to as "fingerprint data". Fingerprint authentication is used for enhancing the security such as restriction of use of the portable telephone device 2 by persons other than the owner thereof, etc., and, when the principal can not be authenticated by the fingerprint authentication, use of all of or a part of functions of the portable telephone device 2 is restricted and, when the authentication is successfully completed, the restriction of use of all of the functions or a part of the functions that have been selected of the portable telephone device 2 is cancelled. For the fingerprint sensor unit 4 used for this fingerprint authentication, fingerprint detection through electro static capacity, variation of a resistance value, light, etc., may be used.

The form detecting unit 6 detects, as the form of use of the portable telephone device 2, whether the apparatus 2 is, for example, in a opened state or a closed state. As to a fingerprint detected by the fingerprint sensor unit 4, the detection form thereof is varied according to the angle of a finger that is placed on the fingerprint sensor unit 4, that is, the positions of the fingerprint sensor unit 4 and the finger. However, this detection form depends on the form of use of the portable telephone device 2. In the portable telephone device 2 (FIG. 2) of the embodiment, because the apparatus 2 has a foldable structure that can be opened and closed, the apparatus includes the form detecting unit 6, and the unit 6 detects whether the apparatus is in the opened state or the closed state and notifies the controlling unit 8 of the form data indicating the state. In this case, when the portable telephone device 2 includes two (2) housing units and the housing units are telescoped by sliding the units relative to each other, the state of the sliding may be detected and, when the two (2) housing units are opened and closed or rotated relative to each other using a two-axis hinge, the states where the units are opened and closed of the apparatus, or where the front face thereof is up or where the back face thereof is up may be detected. The apparatus may be configured for such states of the portable telephone device 2 to detect directly the detection form of a fingerprint from a finger against the fingerprint sensor unit 4.

The controlling unit 8 consists of a CPU (Central Processing Unit), etc., and is a data comparing unit that executes processes such as execution of programs stored in the memory unit 10 as well as a processing unit that controls the fingerprint sensor unit 4 and the form detecting unit 6; executes a process of a detected signal thereof; and, in the fingerprint authenticating process, executes processes such as registration of fingerprint data for fingerprint authentication and, in the fingerprint authentication, executes processes such as inputting of fingerprint data, data correction of inputted data or registered data, etc.

The memory unit 10 consists of recording media such as a ROM (Read-Only Memory), a RAM (Random-Access Memory), etc. to be accessed by the controlling unit 8. The ROM stores a fingerprint registering program 101, a fingerprint authentication program 102, another program 103 that are executed in the controlling unit 8 and the RAM is used as a working area. A fingerprint data storing area 104 that stores the fingerprint data, and a form data storing area 105 that stores the form data are set in the memory unit 10.

The operation input unit 12 includes a key-board, etc., and executes input of telephone numbers, operation of a cursor displayed on the display unit 14, etc. The display unit 14 consists of an LCD (Liquid Crystal Display), etc., and displays inputted information from the operation input unit 12, the contents of control processed in the controlling unit 8, the control result thereof, etc.

The portable telephone device 2 is provided with a radio unit 20, a base-band signal processing unit 22, a voice processing unit 24, a power source controlling unit 26, etc. The radio unit 20 includes an antenna 28 and executes radio communication with calls and packets, etc. The base-band signal processing unit 22 executes a base-band signal process for voice signals, and extraction of a voice signal from a received radio signal, etc. The voice processing unit 24 includes a microphone, a speaker, etc., and executes signal processing of input of voices to be transmitted and output of received voices, etc. The power source controlling unit 26 executes supply of electric power to the various functional units such as the controlling unit 8 by the electric power supply from a battery 30 and control of recharging of the battery 30.

As shown in FIG. 2, this portable telephone device 2 is provided with a first and a second housing units 32, 34 formed of synthesized resin or metal, and these housing units 32, 34 are connected with each other by a hinging unit 36 and are foldable by opening and closing these units around the hinging unit 36 as the center. The housing unit 32 is mounted with the form detecting unit 6, the operation input unit 12, the radio unit 20, the base-band signal processing unit 22, the voice processing unit 24, the power source controlling unit 26, the antenna 28, etc. The housing unit 34 is mounted with the fingerprint sensor unit 4, the controlling unit 8, the memory unit 10, the displaying unit 14 as well as attached with a speaker 38. The form detecting unit 6 consists of, for example, a magnetic switch and a magnet. The magnet is disposed on the housing unit 34 side and the state of the housing units 32, 34 where the units 32, 34 are opened or closed is detected by detecting a magnetic field of the magnet that is moved by the housing unit 34.

An inputted form of a fingerprint to the fingerprint sensor unit 4 of the portable telephone device 2 will be described referring to FIGS. 3A, 3B, 4A and 4B. FIGS. 3A, 3B, 4A and 4B show the fingerprint sensor unit, and an example of the form of fingerprint in putting into the fingerprint sensor unit. In FIGS. 3A, 3B, 4A, and 4B, the same parts as those of FIGS. 1 and 2 are given the same reference numerals.

Figure 3A:
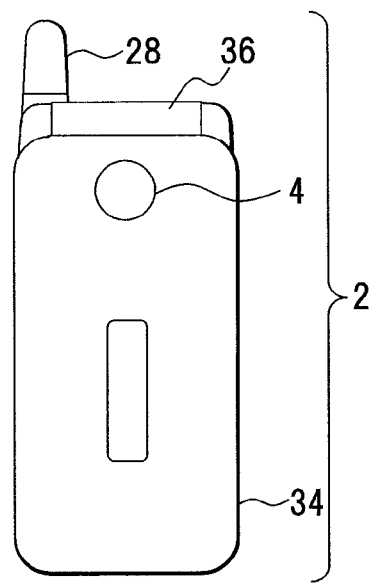
FIGS. 3A and 3B show an example of a form of inputting a fingerprint into a fingerprint sensor unit of the portable telephone device.
Figure 3B:
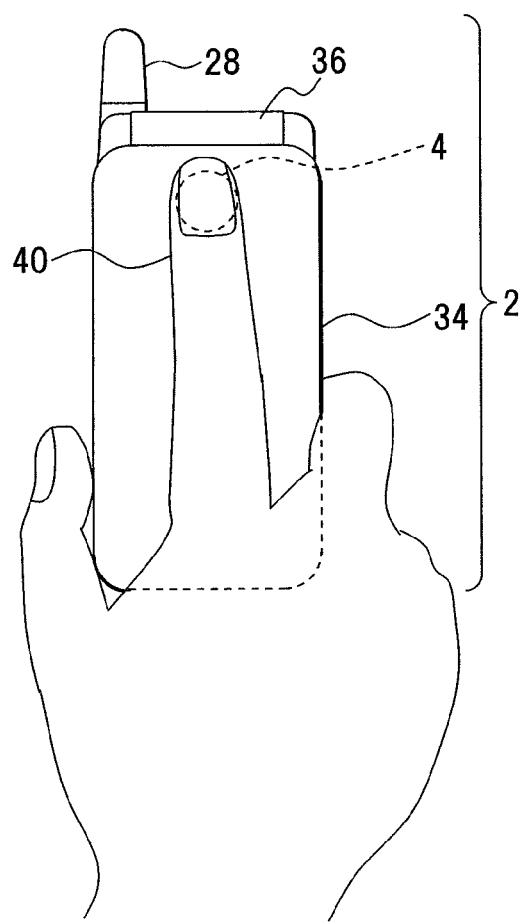

As shown in FIG. 3A, in the portable telephone device 2, the fingerprint sensor unit 4 is installed in the vicinity of the hinging unit 36 of the housing unit 34. As shown in FIG. 3B, for the portable telephone device 2 that is closed, a fingerprint is inputted by scanning a forefinger 40 pressing the forefinger 40 on the fingerprint sensor unit 4, grabbing the housing unit 34 with a hand with the fingerprint sensor unit 4 facing upward.

Figure 4A:
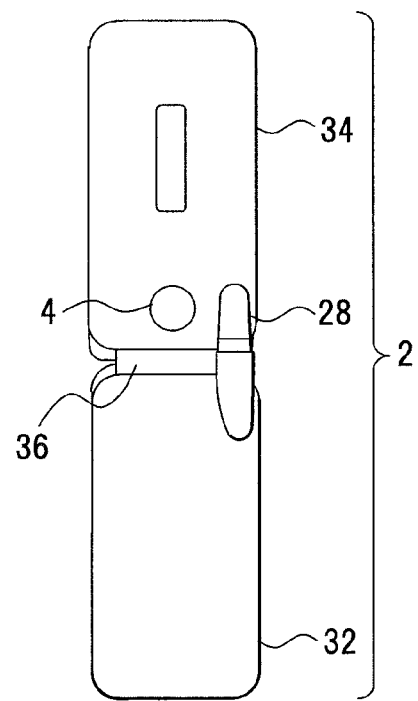
FIGS. 4A and 4B show an example of a form of inputting a fingerprint into a fingerprint sensor unit of the portable telephone device.
Figure 4B:
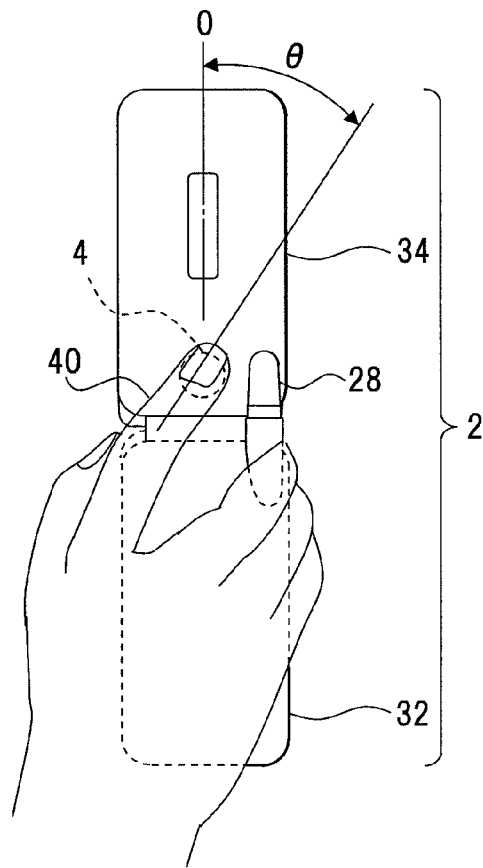

As shown in FIG. 4A, for the portable telephone device 2 that is opened, when the antenna 28 is facing upward, the fingerprint sensor unit 4 located on the housing unit 34 side is in an inverted state compared to the state of FIG. 3A. This state is outputted as form data by detection of opened or closed state of the housing units 32, 34 by the form detecting unit 6. In this case, as shown in FIG. 4B, the fingerprint can be detected by scanning the forefinger 40 pressing the forefinger 40 on the fingerprint sensor unit 4, grabbing the housing unit 32 with a hand. Fingerprint data in this case are a detection form in an inverted state, that is, a detection form rotated by 180 degrees relative to the fingerprint data of FIG. 3B as well as the direction of the forefinger 40 is shifted by an angle $\theta$ taking a virtual center axis "O" penetrating the fingerprint sensor unit 4 of the portable telephone device 2 as a reference. It is expected that this angle $\theta$ will be varied depending on personal differences. Therefore, in this detection form, it is necessary to correct the form data based on this angle $\theta$ for the fingerprint data representing a fingerprint detected by the fingerprint sensor unit 4.

Figure 5:
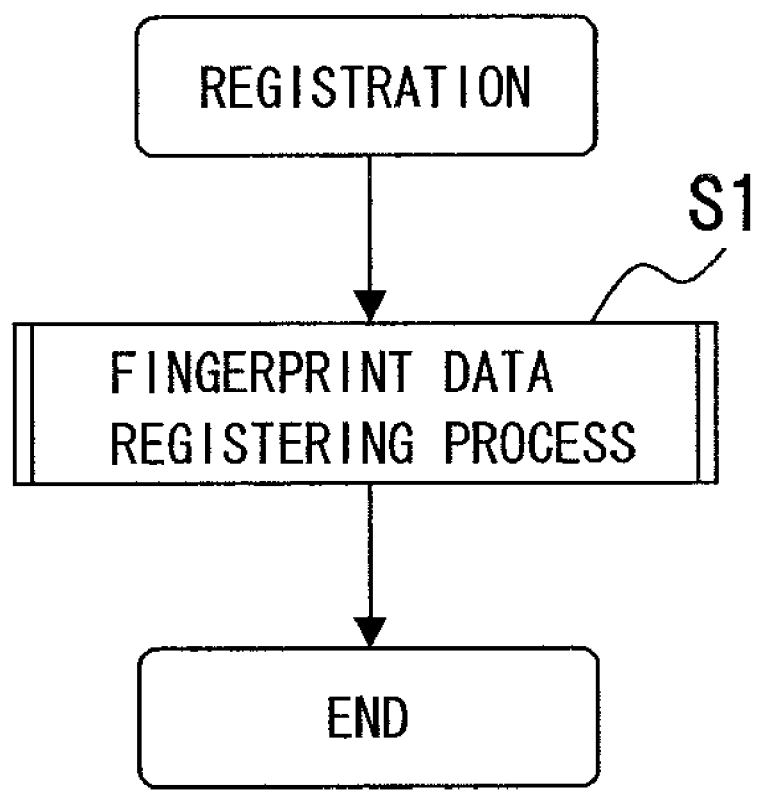
FIG. 5 is a flowchart showing a process procedure of the main routine of fingerprint data registration.
Figure 6:
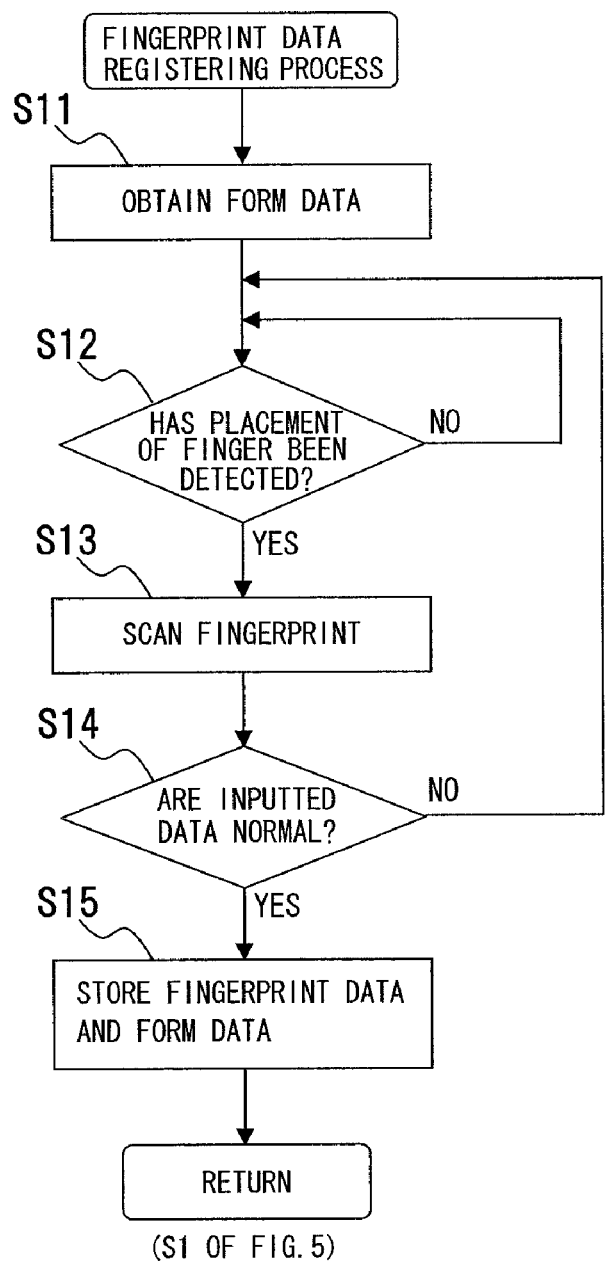
FIG. 6 is a flowchart showing a process procedure of a fingerprint data registering process.
Figure 7A:
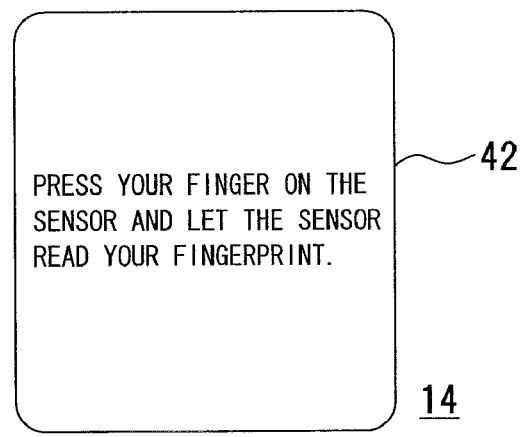
FIGS. 7A and 7B show display messages displayed on a display unit.
Figure 7B:
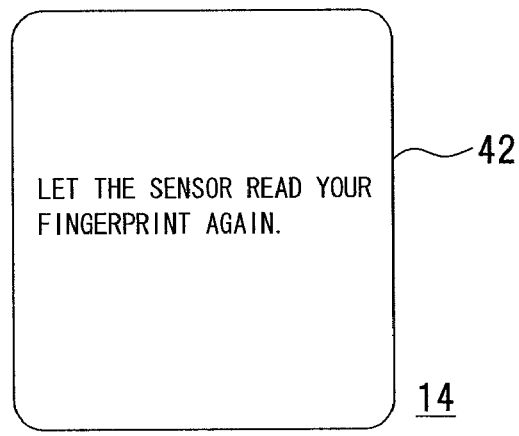

Registration of fingerprint data will be described referring to FIGS. 5, 6, 7A and 7B. FIG. 5 is a flowchart showing a process procedure of the main routine of the fingerprint data registration. FIG. 6 is a flowchart showing a process procedure of a fingerprint data registration process. FIGS. 7A and 7B show display messages displayed on the displaying unit.

The registration of the fingerprint data is necessary for the fingerprint authentication. As shown in FIG. 5, a setting menu is selected from a menu screen by starting up the portable telephone device 2 and causing the portable telephone device 2 to execute the fingerprint registering program 101; the screen transitions from the setting menu to a security mode and to "fingerprint registration"; and the fingerprint data registration process is executed (step S1).

In this fingerprint data registration process, as shown in FIG. 6, the form data representing the opened or closed state of the housing units 32, 34 are obtained as detected information of the form detecting unit 6 (step S11) and a finger is placed on the fingerprint sensor unit 4 following a message (FIG. 7A) displayed on the displaying unit 14. The presence or absence of the finger is detected by the fingerprint sensor unit 4 (step S12) and this state is kept until the finger is detected. When the finger has been detected (YES of step S12) fingerprint scanning is executed as a fingerprint reading operation (step S13). Judgment of whether or not the inputted data by the fingerprint scanning are normal is executed (step S14). When the inputted data are abnormal or invalid (NO of step S14), the fingerprint is inputted again from step S12 following a message (FIG. 7B) displayed on the displaying unit 14. When the inputted data are normal (YES of step S14), the fingerprint data relating to the inputted data are stored in the fingerprint data storing area 104 as well as the form data corresponding to the fingerprint data are stored in the form data storing area 105 (step S15), and the procedure is returned to step S1 (FIG. 5). In this case, the fingerprint data in the fingerprint data storing area 104 and the form data in the form data storing area 105 are correlated with each other, and that the fingerprint data may be either of the pattern data or the characteristics data of the fingerprint is as described above.

In this process, after obtaining the form data of the housing units 32, 34, as shown in FIG. 7A, a message, "Press your finger on the sensor and let the sensor read your fingerprint."

is displayed on a screen 42 on the displaying unit 14 as reporting information to a user. When the scanned data are abnormal or invalid (NO of step S14), as shown in FIG. 7B, a message, "Let the sensor read your fingerprint again."

is displayed as reporting information for urging re-inputting. Following this reporting information, the user can let the fingerprint sensor unit 4 read his/her fingerprint.

Figure 8:
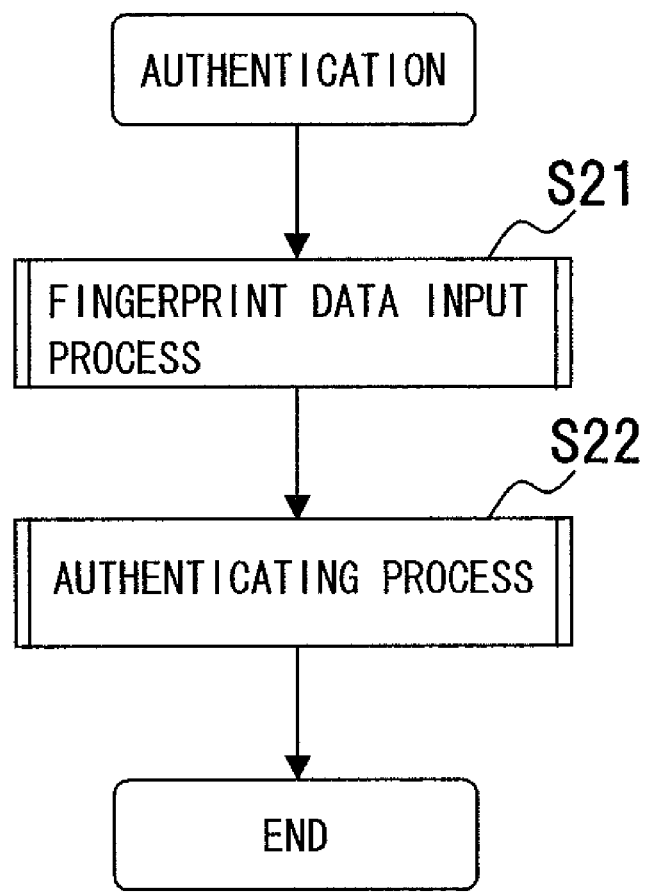
FIG. 8 is a flowchart showing a process procedure of the main routine of the fingerprint authentication.
Figure 9:
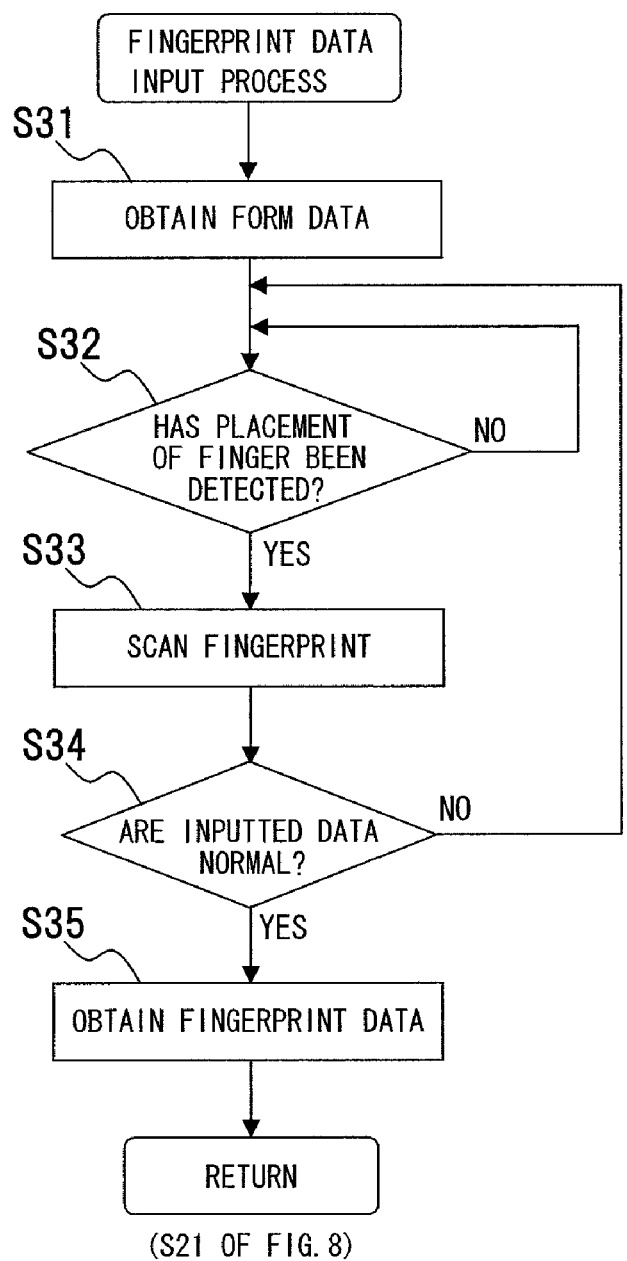
FIG. 9 is a flowchart showing a process procedure of a fingerprint data input process.
Figure 10:
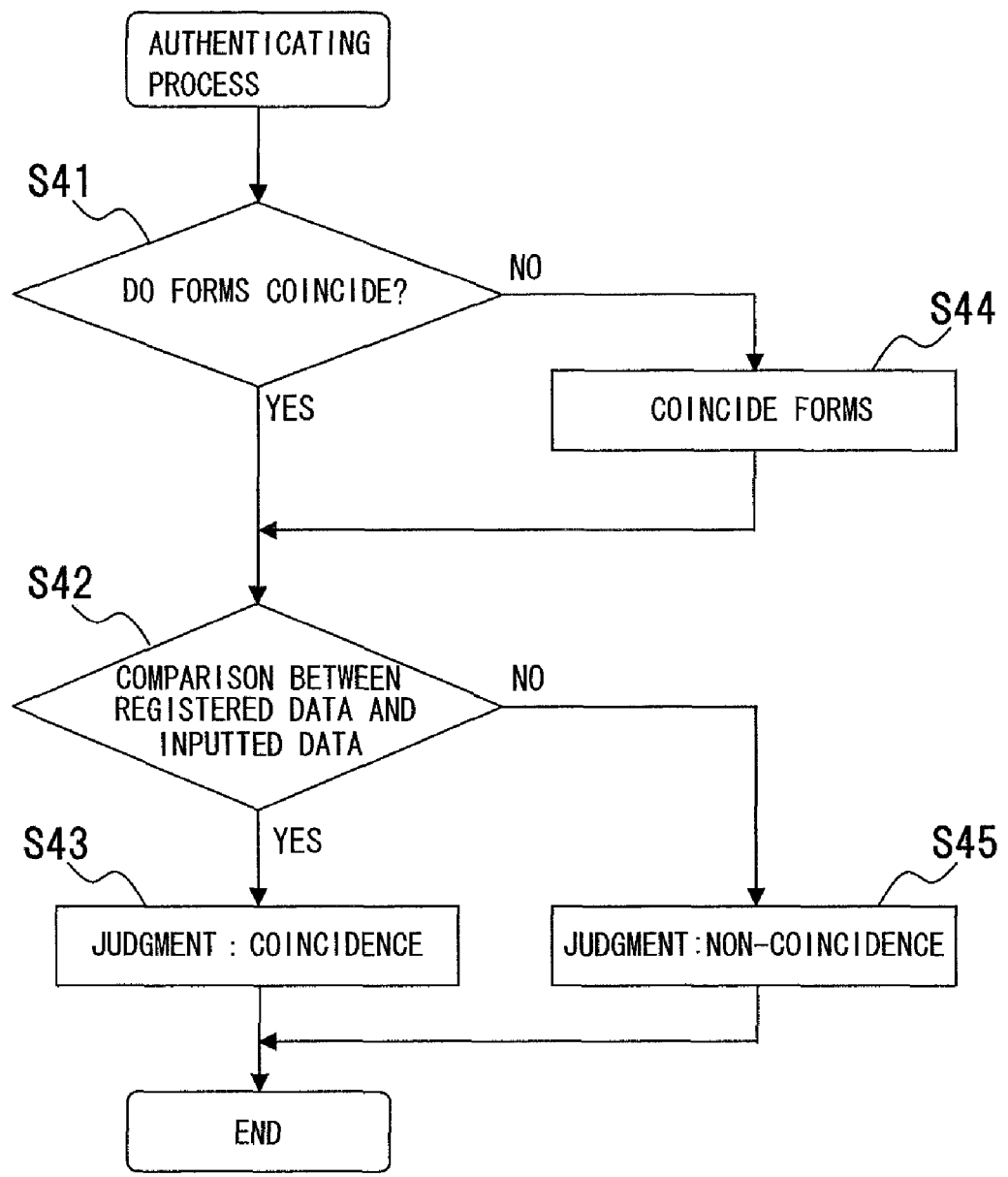
FIG. 10 is a flowchart showing a process procedure of a fingerprint authenticating process.

The fingerprint authentication will be described referring to FIGS. 8, 9, and 10. FIG. 8 is a flowchart showing a process procedure of the main routine of the fingerprint authentication. FIG. 9 is a flowchart showing a process procedure of a fingerprint data input process. FIG. 10 is a flowchart showing a process procedure of fingerprint authentication.

In the fingerprint authentication, as shown in FIG. 8, an authentication menu is selected from a menu screen by starting up the portable telephone device 2 and causing the fingerprint authenticating program 102 to be executed; the screen is shifted from the authentication menu to "fingerprint authentication"; and the fingerprint data input process is executed (step S21). After the input process, the authenticating process (step S22) is executed.

In this fingerprint data input process, as shown in FIG. 9, the form data representing the opened or closed state of the housing units 32, 34 are obtained as the detection information of the form detecting unit 6 (step S31), and a finger is placed on the fingerprint sensor unit 4 following the message (FIG. 7A) displayed on the displaying unit 14. The presence or absence of the placement of the finger is detected by the fingerprint sensor unit 4 (step S32) and this state is kept until the finger is detected. When the finger is detected (YES of step S32), the fingerprint is scanned as a reading operation of the fingerprint (step S33). Whether or not the inputted data of the fingerprint detected are normal is judged (step S34) and, when the data are abnormal or invalid (NO of step S34), the fingerprint inputting is executed again from step S32 following the message (FIG. 7B) displayed on the displaying unit 14. When the inputted data are normal (YES of step S34), thereby, fingerprint data are obtained (step S35). These fingerprint data are used in the fingerprint authentication.

In the fingerprint authenticating process, as shown in FIG. 10, whether or not the registered form data coincide with the detected form data, that is, whether or not the opened or closed state at the time of registration coincides with that at the time of inputting is judged using the form data (step S41). When the data coincide (YES of step S41), comparison between the registered data and the inputted data is executed (step S42). When the data coincide (YES of step S42), a judgment result indicating coincidence is obtained (step S43) and the authenticating process is ended.

When the forms do not coincide (No of step S41), as a process to cause the detection form of the inputted data to coincide, data correction of rotating the inputted data by, for example, 180 degrees as a predetermined angle is applied and the forms coincide (step S44). In this case, the forms may be caused to coincide by applying the data correction to the registered data.

After causing the forms to coincide in this manner, the registered data are compared with the inputted data (step S42). When the data coincide (YES of step S42), a judgment result representing the coincidence is obtained (step S43) and this process is ended. When the data do not coincide (NO of step S42), a judgment result representing the non-coincidence is obtained (step S45) and this authenticating process is ended. In case of the non-coincidence, the confirmation of the principal is unsuccessful and the control such as suppression of the functions, etc., is executed.

According to the embodiment, after the registration of the fingerprint data, the form data that represent the form of use of the portable telephone device 2 are captured when the fingerprint data for the fingerprint authentication are inputted, and the data correction by the form data is applied to the inputted data and the registered data during the fingerprint authentication. Therefore, the user can be relieved of the restrictions on the authenticating operation in the fingerprint authentication. Especially, in the portable telephone device 2 (FIG. 2 to FIG. 4) having the movable portion, the inconvenience that the data are caused not to coincide as the detection form of the fingerprint sensor unit 4 is varied depending on the form of use can be avoided and, therefore, the fingerprint authentication can be executed without paying attention to the finger that can easily operate or the direction (angle) in which the finger is placed on the fingerprint sensor unit 4. As a result, the detection rate of the authentication of the principal can be improved.

Second Embodiment

Figure 11:
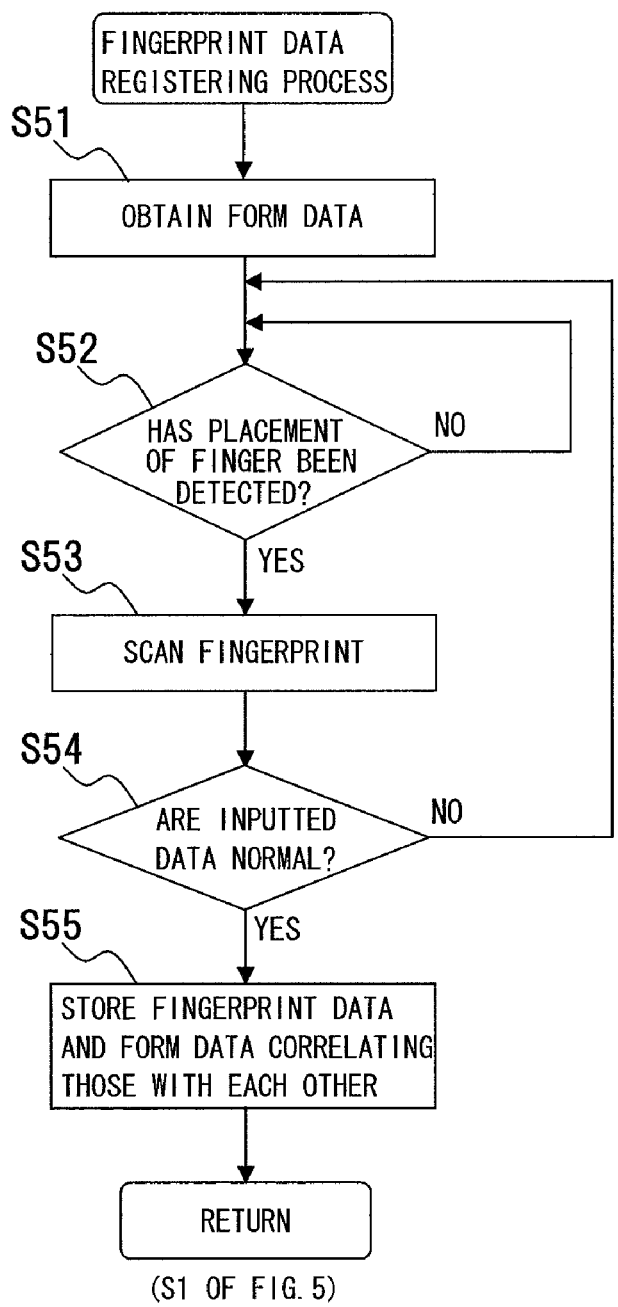
FIG. 11 is a flowchart showing a process procedure of a fingerprint data registering process according to a second embodiment.
Figure 12:
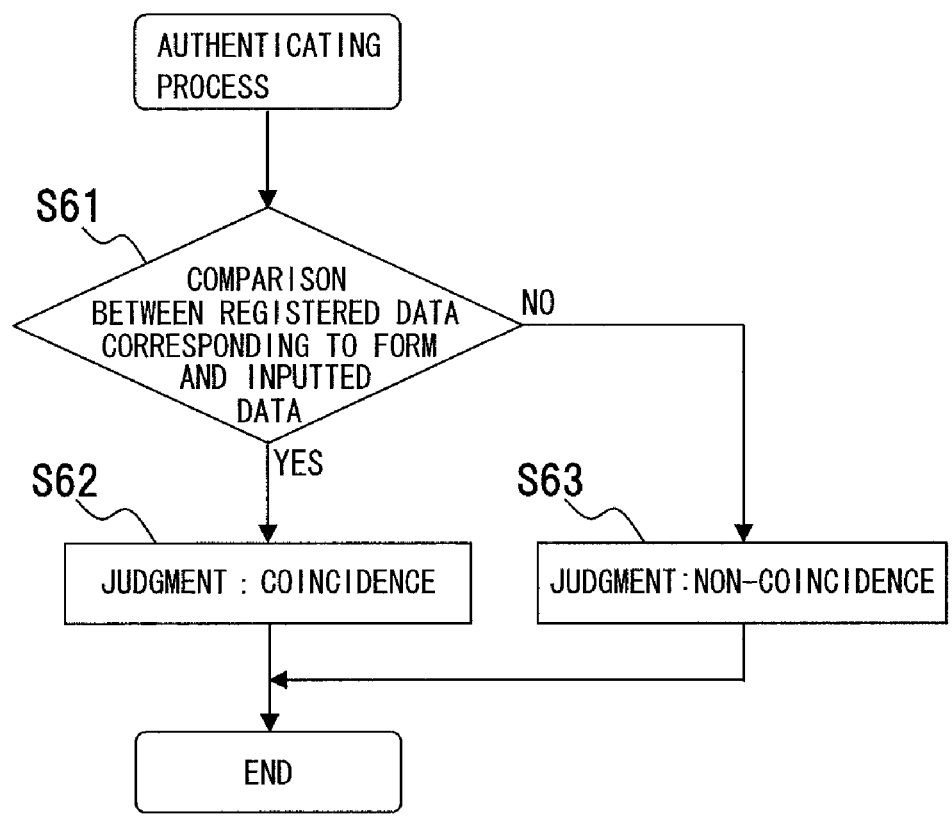
FIG. 12 is a flowchart showing a process procedure of an authenticating process.

A second embodiment of the present invention will be described referring to FIGS. 11 and 12. FIG. 11 is a flowchart showing a process procedure of a fingerprint data registering process. FIG. 12 is a flowchart showing a process procedure of an authenticating process.

In this embodiment: the portable telephone device 2 shown in FIGS. 1 and 2 is also used; in the registering process, the flowchart shown in FIG. 5 is also used; in the authenticating process, the flowchart shown in FIGS. 8 and 9 is also used; and, in the screen process, the messages shown in FIGS. 7A and 7B are also used. Therefore, the description of each of the apparatus and the flowcharts is omitted.

In this embodiment, the fingerprint data are registered in the fingerprint data storing area 104 correlating the data with the form data and the authenticating process is executed based on the registered data.

In this fingerprint data registering process, as shown in FIG. 11, the form data representing the opened or closed state of the housing units 32, 34 are captured as the detection information of the form detecting unit 6 (step S51) and a finger is placed on the fingerprint sensor unit 4 following the message (FIG. 7A) displayed on the displaying unit 14. The presence or absence of the finger is detected by the fingerprint sensor unit 4 (step S52) and this state is kept until the finger is detected. When the finger has been detected (YES of step S52), the fingerprint is scanned as a fingerprint reading operation (step S53). Judgment of whether or not the inputted data of the fingerprint detected are normal is executed (step S54). When the inputted data are abnormal or invalid (NO of step S54), the fingerprint is inputted again from step S52 following a message (FIG. 7B) displayed on the displaying unit 14. When the inputted data are normal (YES of step S54), the fingerprint data and the form data are stored in the fingerprint data storing area 104 of the memory unit 10 (step S55). The form data are stored being correlated with the fingerprint data and the process is returned to step S1 (FIG. 5). In this case, that the fingerprint data may be either of the pattern data or the characteristics data of the fingerprint is as described above.

As to the fingerprint authentication, as shown in FIG. 12, the inputted form data and the inputted fingerprint data are compared with the registered form data and the registered fingerprint data registered being correlated with each other (step S61). When the data coincide (YES of step S61), a judgment result indicating coincidence is obtained (step S62) and this authenticating process is ended.

When the data do not coincide (NO of step S61), a judgment result indicating non-coincidence is obtained (step S63) and this authenticating process is ended.

According to this process, similarly to the above embodiment, the fingerprint authentication can be executed without paying attention to the finger or the direction (angle) in which the finger is placed for inputting the fingerprint, and the detection rate of the authentication of the principal can be improved.

Third Embodiment

Figure 13:
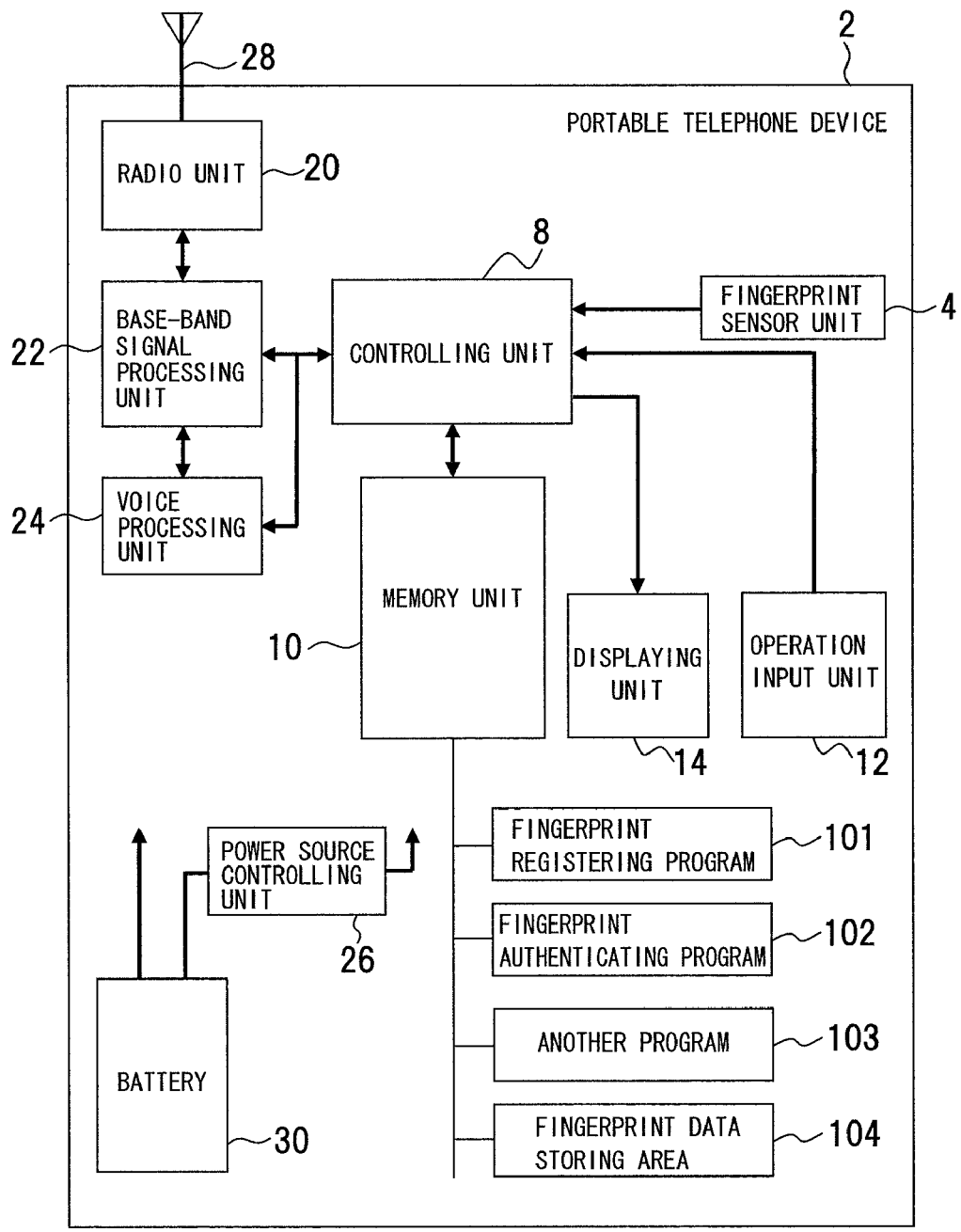
FIG. 13 shows an example of the configuration of a portable telephone device according to a third embodiment.
Figure 14:
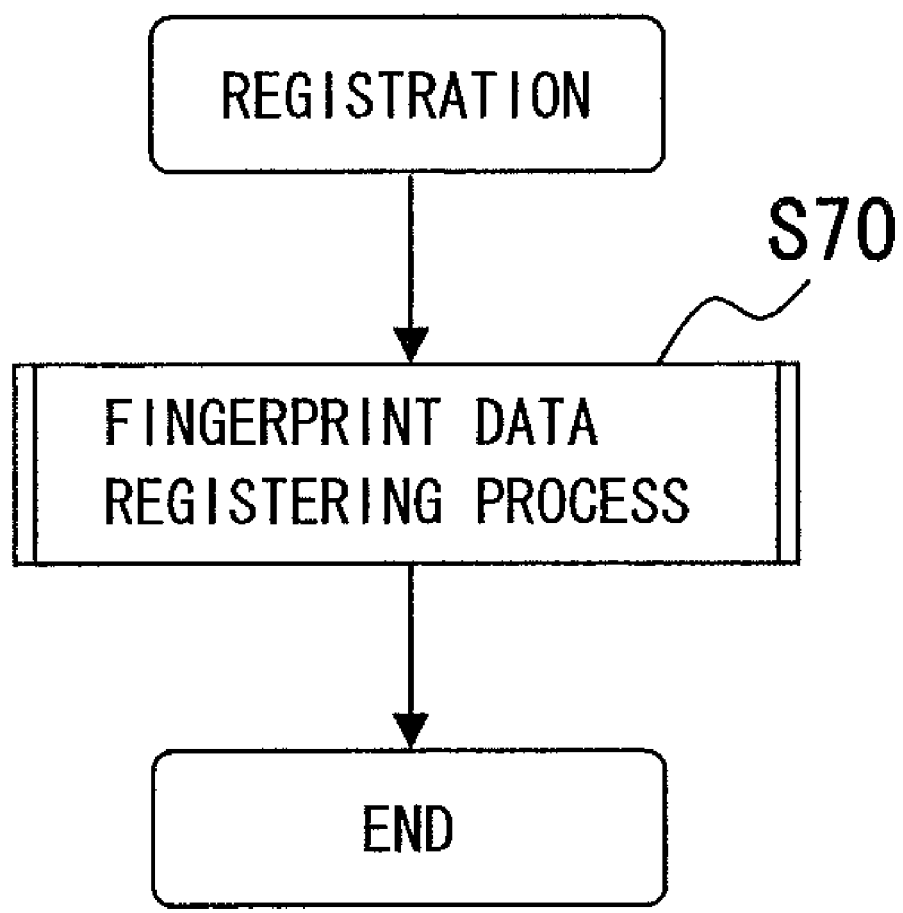
FIG. 14 is a flowchart showing a process procedure of the main routine of fingerprint data registration.
Figure 15:
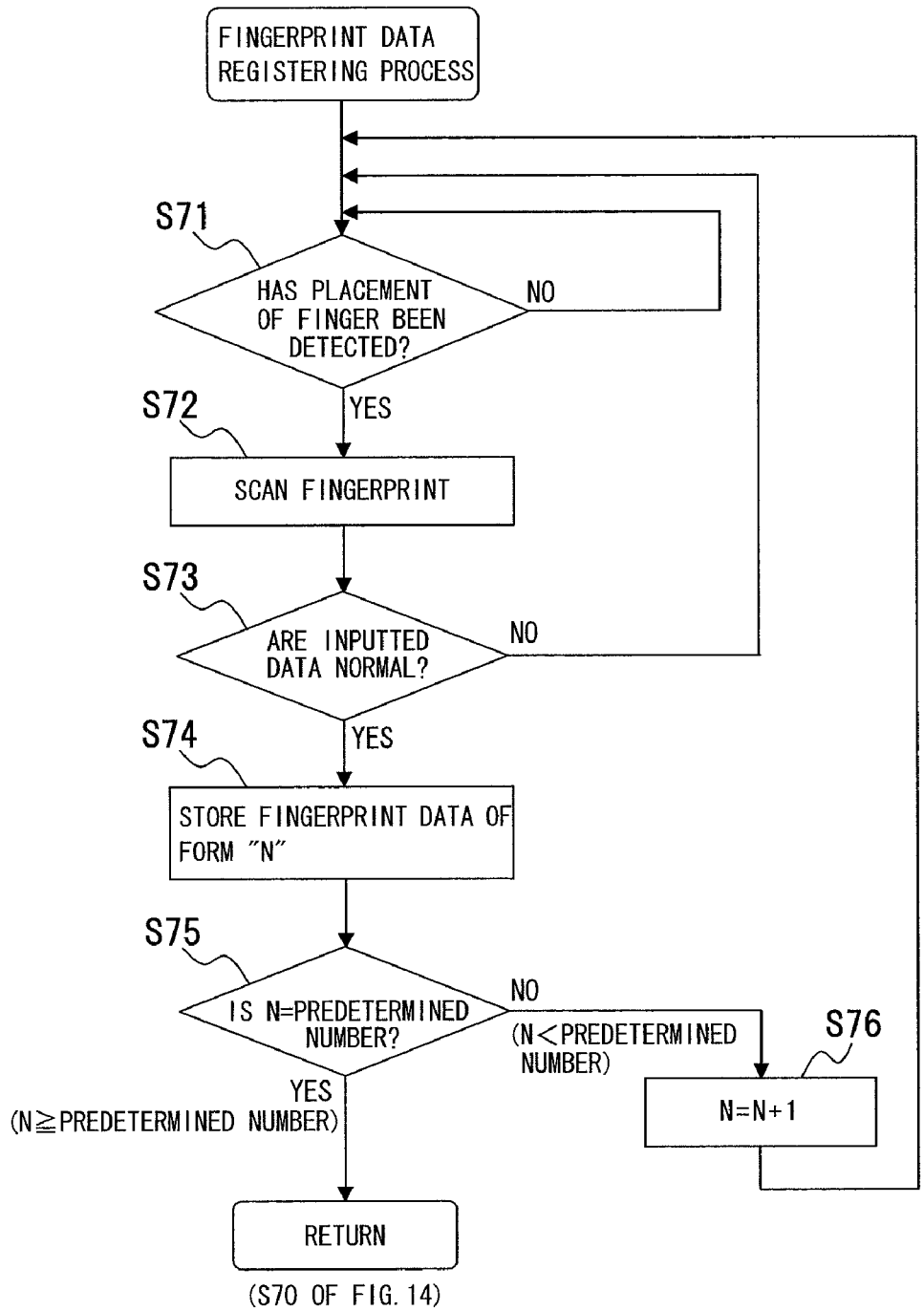
FIG. 15 is a flowchart showing a process procedure of fingerprint data registering process.
Figure 16A:
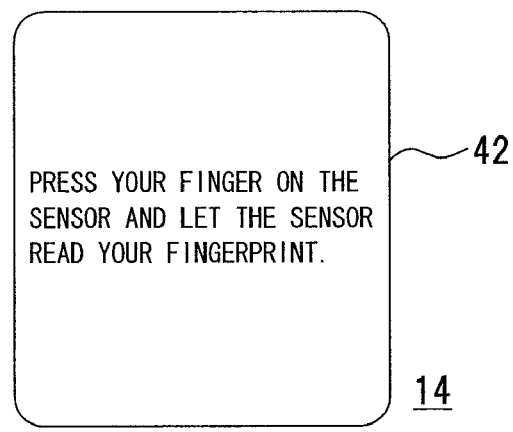
FIGS. 16A, 16B, and 16C show display messages displayed on the display unit.
Figure 16B:
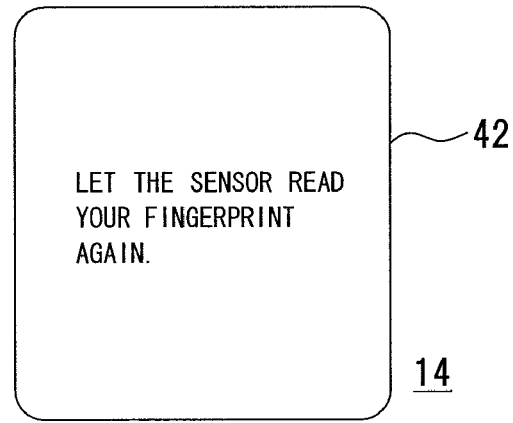
Figure 16C:
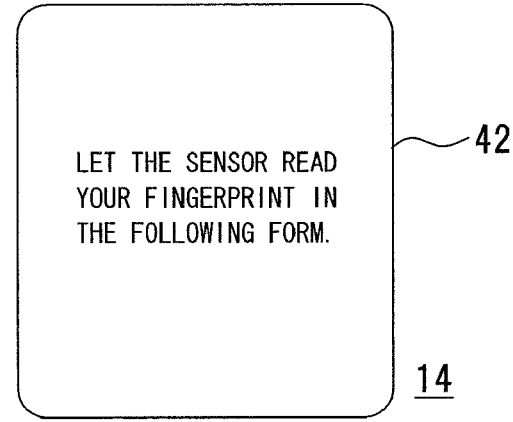

A third embodiment of the present invention will be described referring to FIGS. 13, 14, 15, and 16. FIG. 13 shows an example of the configuration of a portable telephone device according to this embodiment. FIG. 14 is a flowchart showing a process procedure of the main routine of fingerprint data registration. FIG. 15 is a flowchart showing a process procedure of a fingerprint data registering process. FIGS. 16A, 16B, and 16C show display messages displayed on the display unit. In FIGS. 13 and 16, the same parts as those of FIGS. 1, 2, and 7 are given the same reference numerals.

As shown in FIG. 13, the portable telephone device 2 used in this embodiment is configured to capture a plurality of different forms of fingerprint data from the fingerprint sensor unit 4 in stead of the form detecting unit 6 (FIG. 1). Because other parts of the configuration are same as those of the first embodiment, the description of those parts is omitted.

In this embodiment, registration of the fingerprint data is also necessary for the fingerprint authentication. As shown in FIG. 14, a setting menu is selected from a menu screen by starting up the portable telephone device 2 and causing the portable telephone device 2 to execute the fingerprint registering program 101; the screen transitions from the setting menu to the security mode and to "fingerprint registration"; and the fingerprint data registering process is executed (step S70).

In this fingerprint data registering process, as shown in FIG. 15, a finger is placed on the fingerprint sensor unit 4 based on the message (FIG. 16A) displayed on the displaying unit 14. The presence or absence of the finger is detected by the fingerprint sensor unit 4 (step S71) and this state is kept until the finger is detected. When the finger has been detected (YES of step S71), the fingerprint is scanned as a fingerprint reading operation (step S72). Judgment of whether or not the inputted data of the fingerprint detected are normal is executed (step S73). When the inputted data are abnormal or invalid (NO of step S73), the fingerprint is inputted again from step S71 following a message (FIG. 16B) displayed on the displaying unit 14. When the inputted data are normal (YES of step S73), the fingerprint data are stored in the fingerprint data storing area 104 as a form "N" (step S74). Whether or not the value "N" indicating the form is a predetermined number "Ne" is judged (step S75). When N is equal to or larger than the predetermined number Ne (N≧Ne), the fingerprint data registering process is ended and the process is returned to step S70 (FIG. 14). When N is smaller than the predetermined number Ne (N<Ne), N is incremented (N=N+1) (step S76), and an input process is executed following a message (FIG. 16C) displayed on the displaying unit 14, and the form N is caused to reach the predetermined number Ne. The process is returned to step S70 (FIG. 14).

In this process, when the fingerprint is inputted, as shown in FIG. 16A, a message,
"Press your finger on the sensor and let the sensor read your fingerprint."
is displayed on a screen 42 on the displaying unit 14 as reporting information to the user. When the inputted data are abnormal or invalid (NO of step S73), as shown in FIG. 16B, a message,
"Let the sensor read your fingerprint again."
is displayed as reporting information for urging re-inputting. When the fingerprint is inputted in an altered form, as the reporting information thereof, as shown in FIG. 16C, a message,
"Let the sensor read your fingerprint in the following form."
is displayed and, simultaneously, a display of an inputting form is created on the screen 42. Due to this reporting information, the user can cause the fingerprint sensor unit 4 to read the fingerprint in various forms.

Figure 17:
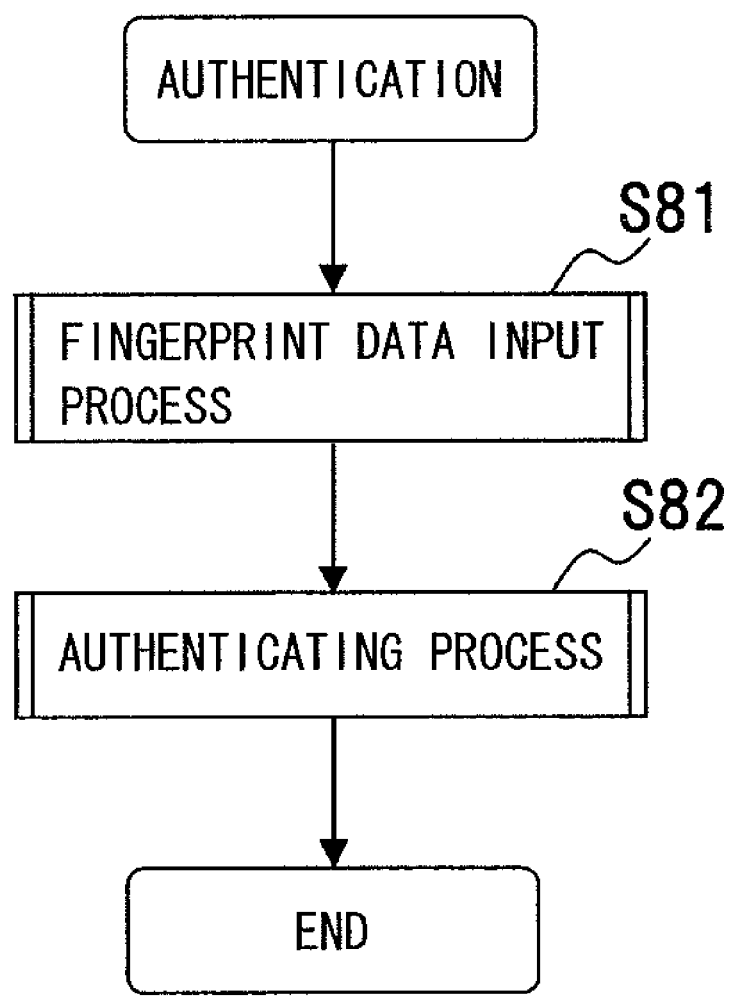
FIG. 17 is a flowchart showing a process procedure of the main routine of the fingerprint authentication.
Figure 18:
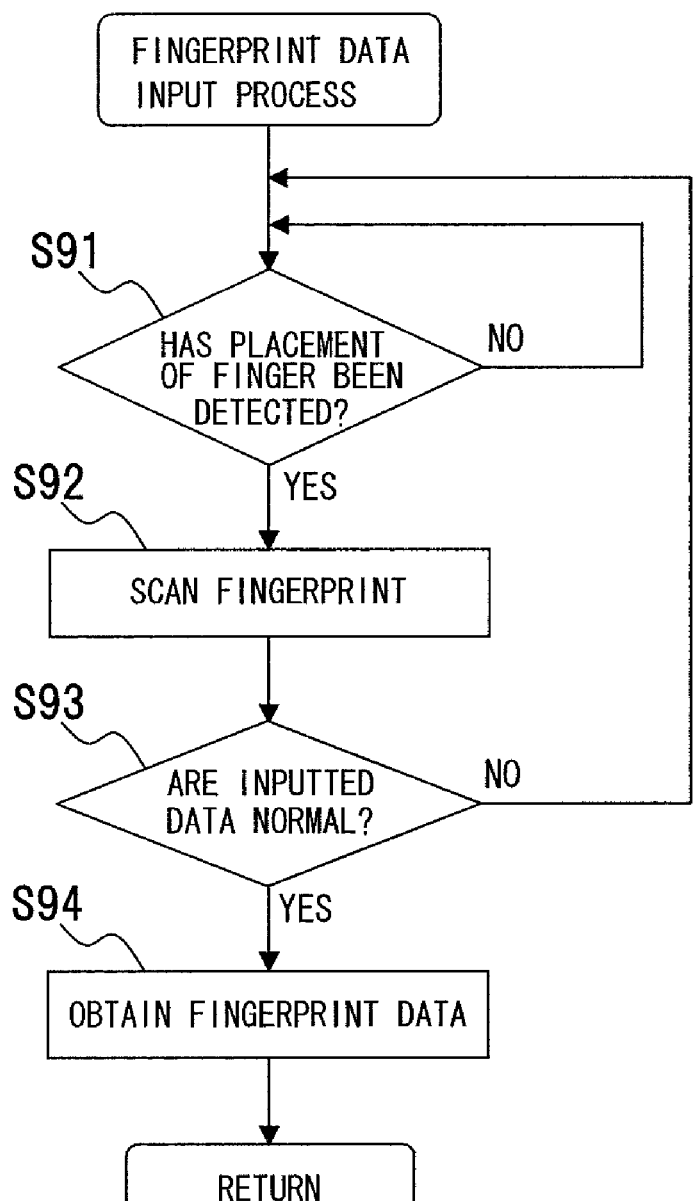
FIG. 18 is a flowchart showing a process procedure of a fingerprint data input process.
Figure 19:
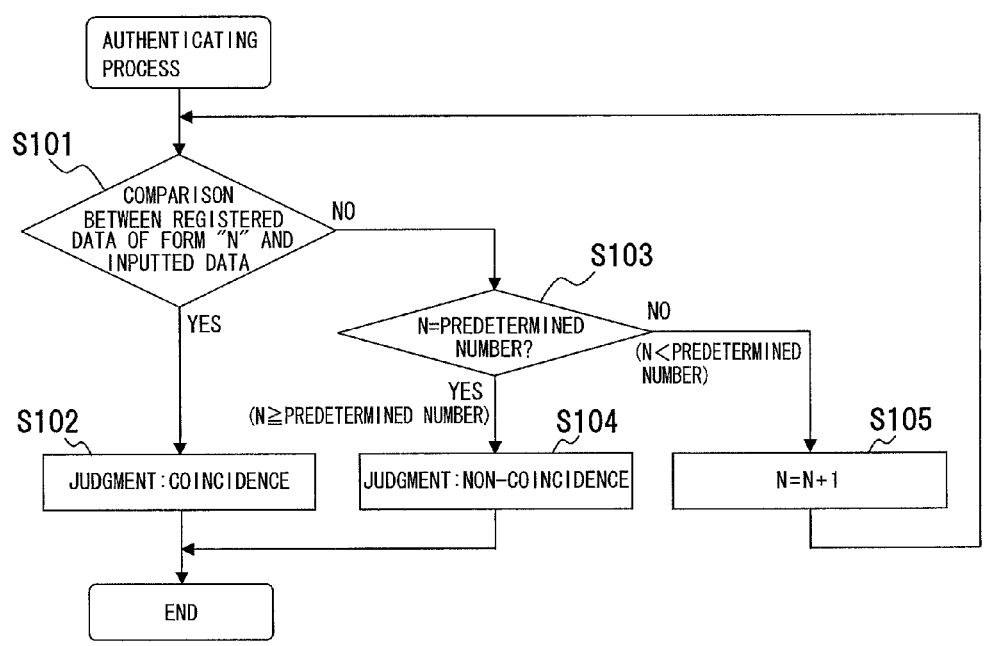
FIG. 19 is a flowchart showing a process procedure of a fingerprint authenticating process.

The fingerprint authentication will be described referring to FIGS. 17, 18, and 19. FIG. 17 is a flowchart showing a process procedure of the main routine of the fingerprint authentication. FIG. 18 is a flowchart showing a process procedure of a fingerprint data input process. FIG. 19 is a flowchart showing a process procedure of the fingerprint authentication.

In the fingerprint authentication, as shown in FIG. 17, an authentication menu is selected from a menu screen by starting up the portable telephone device 2 and causing the fingerprint authenticating program 102 to be executed; the screen is shifted from the authentication menu to "fingerprint authentication"; and the fingerprint data input process is executed (step S81). After the input process, the authenticating process (step S82) is executed.

In this fingerprint data input process, as shown in FIG. 18, a finger is placed on the fingerprint sensor unit 4 following the message (FIG. 16A) displayed on the displaying unit 14. The presence or absence of the placement of the finger is detected by the fingerprint sensor unit 4 (step S91) and this state is kept until the finger is detected. When the finger is detected (YES of step S91), the fingerprint is scanned as a reading operation of the fingerprint (step S92). Whether or not the inputted data detected are normal is judged (step S93) and, when the inputted data are abnormal or invalid (NO of step S93), the fingerprint inputting is executed again from step S91 following the message (FIG. 16B) displayed on the displaying unit 14. When the inputted data are normal (YES of step S93), fingerprint data are obtained (step S94). These fingerprint data are used in the fingerprint authentication.

In the fingerprint authenticating process, as shown in FIG. 19, N types of registered data indicating different registered forms are compared with the inputted data (step S101). When these data coincide (YES of step S101), a judgment result indicating the coincidence is obtained (step S102) and this authenticating process is ended.

When the registered data of a form "N" do not coincide with the inputted data (NO of step S101), whether or not the form "N" is a predetermined number "Ne" is judged (step S103). When N is equal to or larger than the predetermined number Ne (N≧Ne) (YES of step S103), the inputted data do not coincide with the registered data of the form N and a judgment result indicating the non-coincidence is obtained (step S104), and this authenticating process is ended.

When N is smaller than the predetermined number Ne (N<Ne) (NO of step S103), the form N is varied, that is, N is incremented (N=N+1) until N reaches the predetermined number Ne (step S105), and the comparing process of the registered data of different forms selected from the registered data in response to renewal of N and the inputted data is continued. When the registered data coincide with the inputted data (YES of step S101), a judgment result indicating the coincidence is obtained (step S102) and, when the registered data do not coincide with the inputted data, a judgment result indicating the non-coincidence is obtained (step S104) and this authenticating process is ended.

When the inputted data coincide with the registered data, in the portable telephone device 2, the suppression of the functions is cancelled or the suppression of the functions is set. When the inputted data do not coincide with the registered data, the confirmation of the principal is unsuccessful and the suppression of the functions can not be cancelled.

As described above, in the embodiment, a plurality of different forms of fingerprint data are registered and a reference to be compared is selected from the registered data of different forms and is compared with the inputted data. Therefore, the user can be relieved of the restrictions on the authenticating operation in the fingerprint authentication. As already described above, as shown in FIGS. 2 to 4, in the portable telephone device 2 having the movable portion, the inconvenience due to the variation of the pattern detected by the fingerprint sensor unit 4 depending on the form of use is avoided and the fingerprint authentication can be executed without paying attention to the finger that can easily operate or the direction (angle) in which the finger is placed on the fingerprint sensor unit 4. The detection rate of the authentication of the principal can be improved also by this embodiment.

Fourth Embodiment

Figure 20:
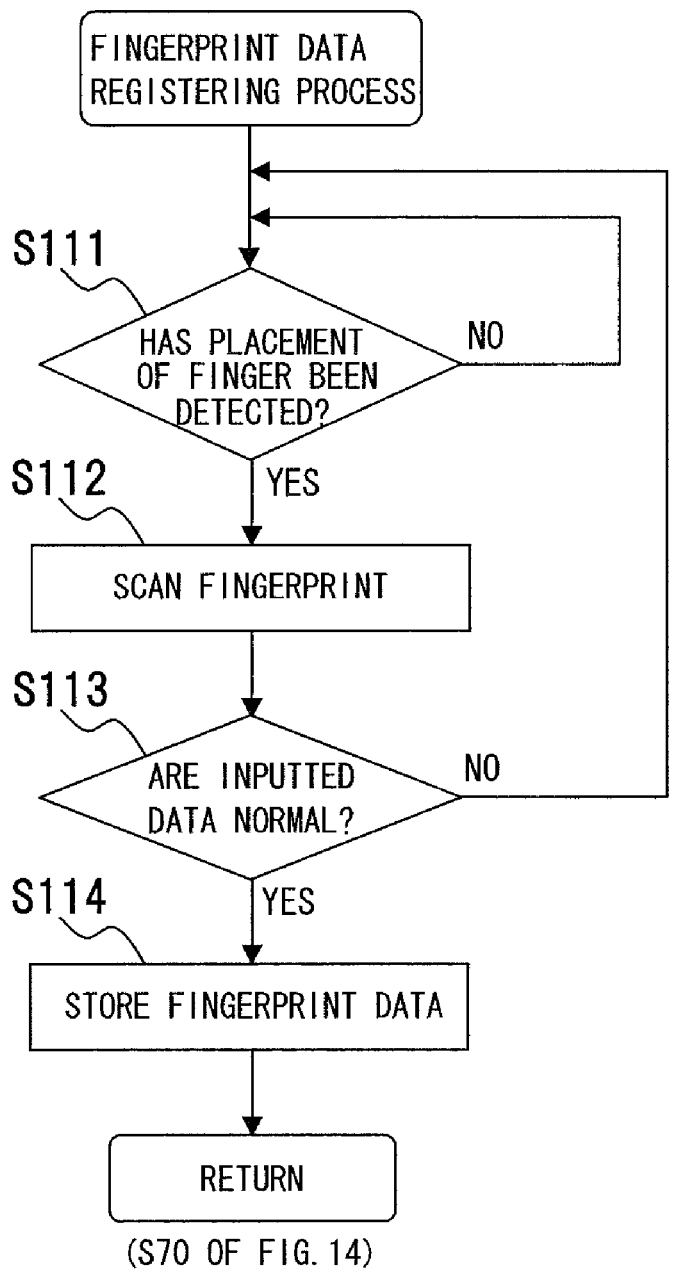
FIG. 20 is a flowchart showing a process procedure of a fingerprint data registering process concerning a portable telephone device according to a fourth embodiment.
Figure 21:
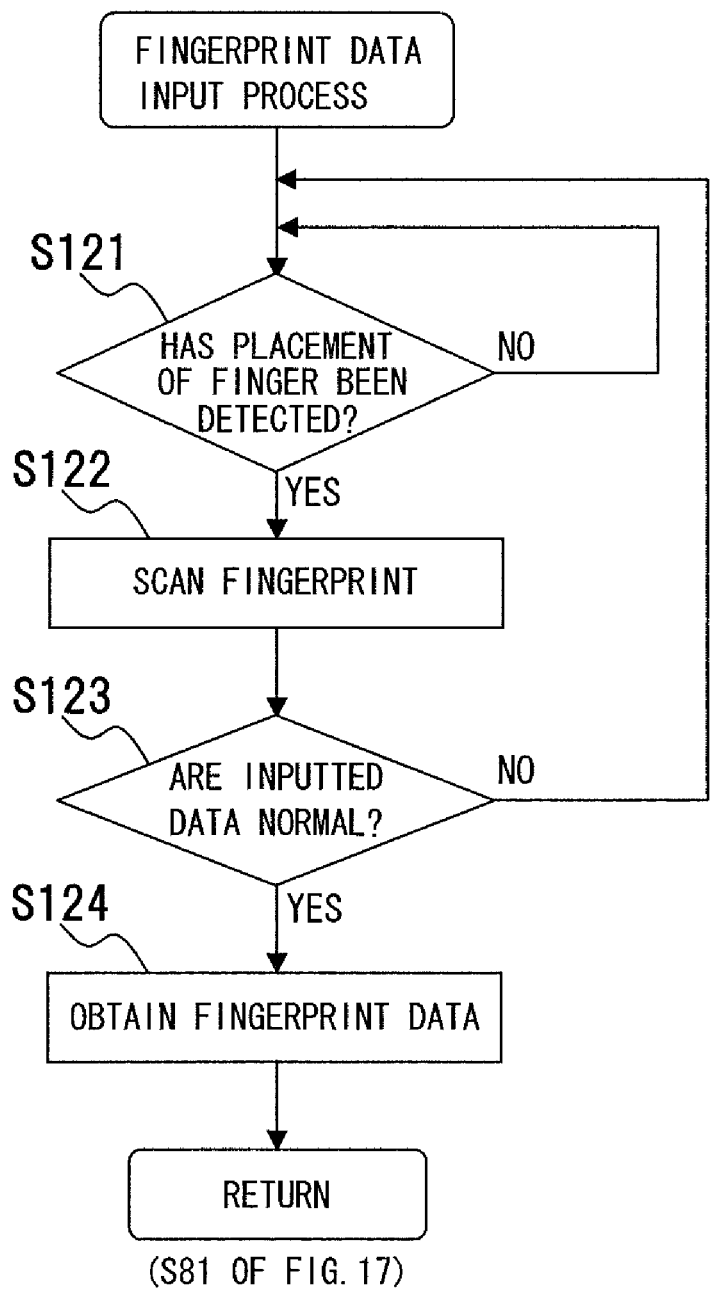
FIG. 21 is a flowchart showing a process procedure of a fingerprint data input process.
Figure 22:
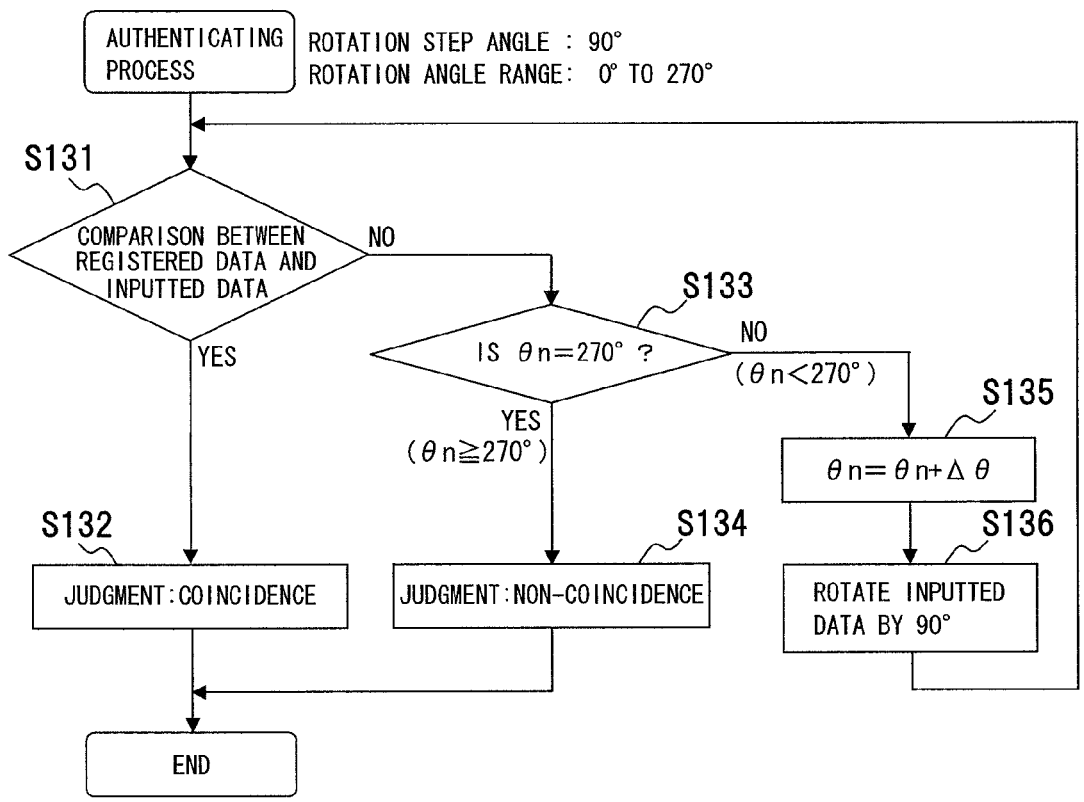
FIG. 22 is a flowchart showing a process procedure of a fingerprint authenticating process.

A fourth embodiment of the present invention will be described referring to FIGS. 20, 21, and 22. FIG. 20 is a flowchart showing a process procedure of a fingerprint data registering process. FIG. 21 is a flowchart showing a process procedure of a fingerprint data input process. FIG. 22 is a flowchart showing a process procedure of the fingerprint authentication.

In this embodiment: the portable telephone device 2 shown in FIG. 13 is used; in the registering process of the fingerprint data, the flowchart shown in FIG. 14 is also used; in the authenticating process, the flowchart shown in FIG. 17 is also used; and, in the screen process, the messages shown in FIGS. 7A and 7B are also used. Therefore, the description of each of the apparatus and the flowcharts is omitted.

In this fingerprint data registering process, as shown in FIG. 20, a finger is placed on the fingerprint sensor unit 4 based on a message (FIG. 7A) displayed on the displaying unit 14. The presence or absence of the placement of the finger is detected by the fingerprint sensor unit 4 (step S111) and this state is kept until the finger is detected. When the finger has been detected (YES of step S111), fingerprint scanning is executed as a fingerprint reading operation (step S112). Judgment of whether or not the inputted data detected are normal is executed (step S113). When the inputted data are abnormal or invalid (NO of step S113), the fingerprint is inputted again from step S111 following the message (FIG. 7B) displayed on the displaying unit 14. When the inputted data are normal (YES of step S113), the inputted fingerprint data are stored in the fingerprint data storing area 104 (step S114) and this process is ended (FIG. 14).

In the fingerprint data input process executed in the fingerprint authentication, as shown in FIG. 21, a finger is placed on the fingerprint sensor unit 4 based on the message (FIG. 7A) displayed on the displaying unit 14. The presence or absence of the placement of the finger is detected by the fingerprint sensor unit 4 (step S121) and this state is kept until the finger is detected. When the finger has been detected (YES of step S121), fingerprint scanning is executed as a fingerprint reading operation (step S122). Judgment of whether or not the inputted data detected are normal is executed (step S123). When the inputted data are abnormal or invalid (NO of step S123), the fingerprint is inputted again from step S121 following the message (FIG. 7B) displayed on the displaying unit 14. When the inputted data are normal (YES of step S123), the fingerprint data are obtained (step S124), and the procedure is returned to the fingerprint data input process and is advanced to the authenticating process (FIG. 17).

In the authenticating process, as shown in FIG. 22, the inputted data are compared with the registered data (step S131). When the data coincide (YES of step S131), a judgment result indicating coincidence is obtained (step S132) and the authenticating process is ended.

When the registered data do not coincide with the inputted data (NO of step S131), the inputted data are rotated by a predetermined angle En and whether or not the rotation angle $\theta n$ is, for example, 270 [°] as the maximum angle $\theta max$ is judged (step S133). When the rotation angle $\theta n=\theta max \geq 270$ [°] (YES of step S133), the inputted data do not coincide with the registered data even if the angle $\theta n$ is varied. Therefore, a judgment result indicating non-coincidence is obtained (step S134) and the authenticating process is ended.

When the rotation angle $\theta n$ of the inputted data is smaller than the maximum angle $\theta max$ (NO of step S133), a rotation step angle $\Delta\theta$ is added to the current angle $\theta n$ ($\theta n=\theta n+\Delta\theta$) (step S135). When this rotation step angle $\Delta\theta$ is, for example, 90[°], the inputted data are rotated by 90[°] and the data correction is applied to the inputted data (step S136) and the comparison process is continued (step S131 to S134). When the inputted data coincide with the registered data during the time period during which the rotation angle $\theta n$ reaches the maximum angle $\theta max$ (YES of step S131), a judgment result indicating coincidence is obtained (step S132) and, when the data do not coincide (NO of step S131), a judgment result indicating non-coincidence is obtained (step S134) and this process is ended.

In this embodiment, the angle of the inputted data is varied. However, the comparison process may be executed by varying the angle of the outputted data.

In this manner, according to the above embodiment, because the registered data and the inputted data are compared with each other varying the angle of the registered data or the inputted data. Therefore, as shown in FIGS. 2 to 4, the inconvenience due to the variation of the pattern detected by the fingerprint sensor unit 4 depending on the form of use of the portable telephone device 2 having a movable portion can also be avoided, and the fingerprint authentication can be executed without paying attention to the finger that can easily operate or the direction (angle) in which the finger is placed on the fingerprint sensor unit 4. Therefore, the detection rate of the authentication of the principal can be improved.

Figure 23:
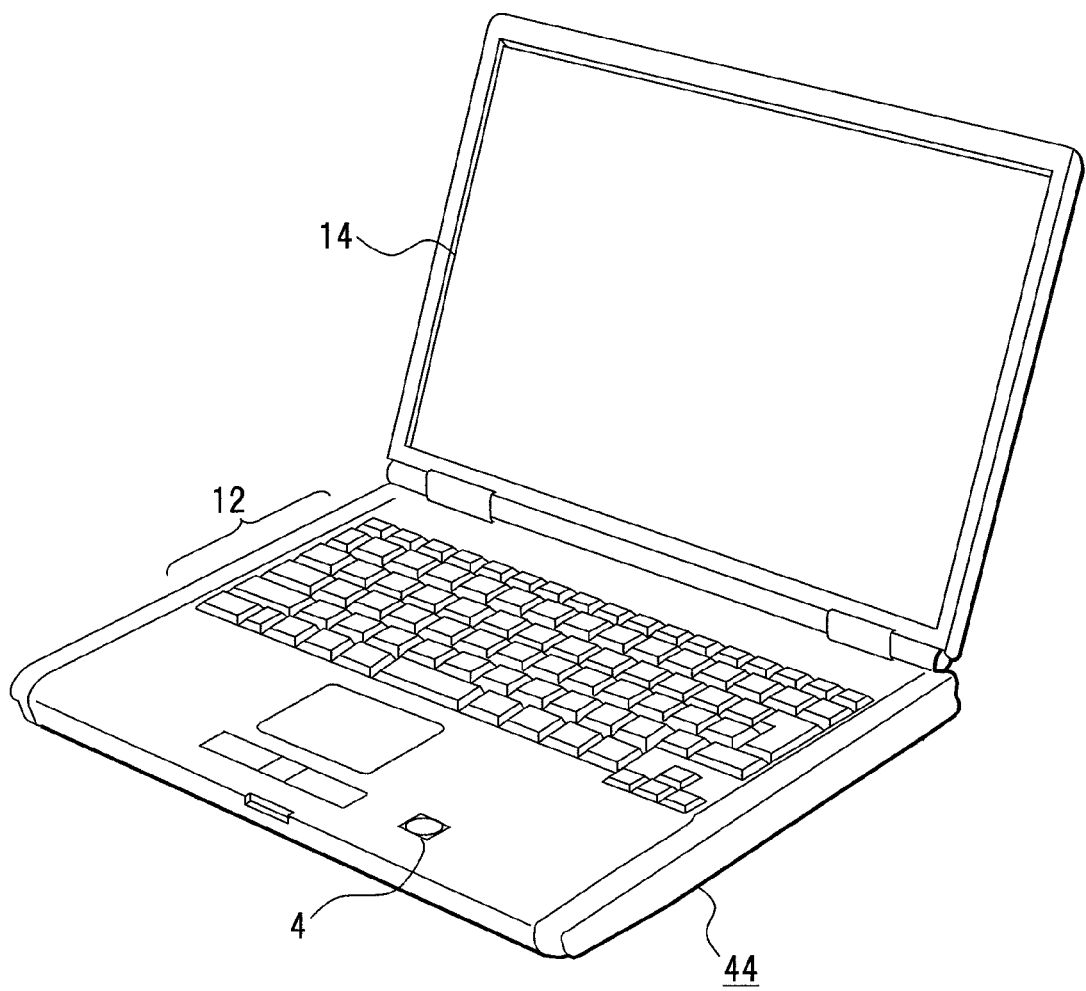
FIG. 23 shows a personal computer according to another embodiment.

Other Embodiments (1) In the above embodiment, the portable telephone device 2 is exemplified as a fingerprint authenticating apparatus or an electronic apparatus having a fingerprint authenticating function. However, the present invention may be configured to be a single fingerprint authenticating apparatus, may be applied to a personal computer 44 as shown in FIG. 23, or may be applied to various apparatuses such as another electronic apparatus, car, etc., and is not limited to the portable telephone device in the above embodiment. In FIG. 23, the same parts as those in FIGS. 1 and 13 are given the same reference numerals and the description of those parts is omitted.

(2) As this detection of the detection form, the direction, etc., of the finger to the fingerprint sensor unit 4 may be detected directly, or this detection may be detection that predicts the direction, etc., of the contact of the finger based on the operation to the portable telephone device 2.

(3) In the above embodiment, a portable telephone device of a foldable type is assumed and, therefore, the two (2) states of being opened and closed of the housing units 32, 34 are assumed. However, for a portable telephone device having housing units of a slidable type or a two (2)-axis-hinge type, the registration of fingerprint data or the rotation of authentication data may be executed corresponding to a varied form such as sliding or rotation, etc., of each of the housing units.

The present invention relates to the fingerprint authentication that can be used for a portable telephone device, etc., having a fingerprint authenticating function and, because the comparison of data and the fingerprint authentication are executed referring to the form data concerning the detection of the fingerprint for the inputted data and the registered data concerning the fingerprint, the precision of the authenticating function can be improved and the present invention is useful.

While the illustrative and presently preferred embodiments of the present invention have been described in detail herein, it is to be understood that the inventive concepts may be otherwise variously embodied and employed and that the appended claims are intended to be construed to include such variations except insofar as limited by the prior art.

What is claimed is:

1. A fingerprint authenticating apparatus comprising:
a housing unit, a form of which varies differently;
a fingerprint sensor unit that is installed in the housing unit and detects a fingerprint from a finger;
a form detecting unit that detects the form of the housing unit when the fingerprint sensor unit detects the fingerprint from the finger;
a registering unit that registers fingerprint data representing the fingerprint detected by the fingerprint sensor unit; and
a comparing unit that compares registered data of the registering unit and inputted data obtained from the fingerprint sensor unit with each other, referring to the form detected when the fingerprint is detected.

2. A fingerprint authenticating apparatus according to claim 1, wherein the fingerprint data and form data representing the form are registered in the registering unit, being correlated with each other.

3. A fingerprint authenticating apparatus comprising:
a fingerprint sensor unit in which a detection form of a fingerprint varies according to a relative position relationship with a finger;
a registering unit that registers a plurality of sets of fingerprint data detected by the fingerprint sensor unit with the detection form;
a comparing unit that compares comparison fingerprint data selected from the plurality of sets of fingerprint data registered in the registering unit with inputted fingerprint data detected by the fingerprint sensor unit, the comparison fingerprint data being corrected by a detection form of the inputted fingerprint data, or the inputted fingerprint data being corrected by a detection form of the comparison fingerprint data;
a displaying unit that displays a message; and
a processing unit that causes the displaying unit to display a message representing reporting information for urging inputting of a fingerprint to the fingerprint sensor unit, and causes the registering unit to register a plurality of sets of fingerprint data obtained from the fingerprint sensor unit.

4. A fingerprint authenticating apparatus comprising:
a fingerprint sensor unit in which a detection form of a fingerprint varies according to a relative position relationship with a finger;
a processing unit that judges whether or not fingerprint data representing the fingerprint detected by the finger print sensor unit with the detection form is normal;
a registering unit that registers the fingerprint data judged to be normal by the processing unit; and
a comparing unit that compares comparison fingerprint data selected from the fingerprint data registered in the registering unit with inputted fingerprint data detected by the fingerprint sensor unit, the comparison fingerprint data being corrected by a detection form of the inputted fingerprint data, or the inputted fingerprint data being corrected by a detection form of the comparison fingerprint data.

5. A fingerprint authenticating apparatus according to claim 4, wherein
the detection form has a personal difference, and the comparing unit corrects the comparison fingerprint data or the inputted fingerprint data with the detection form having the personal difference.

6. A fingerprint authenticating method comprising:
detecting a fingerprint from a finger by a fingerprint sensor unit installed in a housing unit, a form of the housing unit varying differently;
detecting the form of the housing unit by a form detecting unit when the fingerprint is detected from the finger by the fingerprint sensor unit;
registering fingerprint data representing the fingerprint detected by the fingerprint sensor unit, in a registering unit; and
comparing registered data in the registering unit and inputted data obtained from the fingerprint sensor unit with each other, by a comparing unit, referring to the form detected when the fingerprint is detected.

7. A fingerprint authenticating method according to claim 6, comprising registering the fingerprint data and form data representing the form, being correlated with each other, in the registering unit.

8. A fingerprint authenticating method comprising:
detecting a fingerprint by a fingerprint sensor unit in which a detection form of the fingerprint varies according to a relative position relationship with a finger;
registering a plurality of sets of fingerprint data detected by the fingerprint sensor unit with the detection form into a registering unit;
comparing, by a comparing unit, comparison fingerprint data selected from the plurality of sets of registered fingerprint data registered in the registering unit with inputted fingerprint data detected by the fingerprint sensor unit, the comparison fingerprint data being corrected by a detection form of the inputted fingerprint data, or the inputted fingerprint data being corrected by a detection form of the comparison fingerprint data; and
displaying a message representing reporting information for urging inputting of the fingerprint on a displaying unit.

9. A fingerprint authenticating method comprising:
detecting a fingerprint by a fingerprint sensor unit in which a detection form of the fingerprint varies according to a relative position relationship with a finger;
judging whether or not fingerprint data representing the fingerprint detected by the fingerprint sensor unit with the detection form is normal, by a processing unit;
registering the fingerprint data judged to be normal by the processing unit, in a registering unit; and
comparing, by a comparing unit, comparison fingerprint data selected from the fingerprint data registered in the registering unit with inputted fingerprint data detected by the fingerprint sensor unit, the comparison fingerprint data being corrected by a detection form of the inputted fingerprint data, or the inputted fingerprint data being corrected by a detection form of the comparison fingerprint data.

10. A computer-readable recording medium storing a fingerprint authenticating program executed by a computer, the program causing the computer to perform a method, the method including:
detecting a fingerprint;
detecting a form of a housing unit, the form varying differently;
registering fingerprint data representing the fingerprint detected; and
comparing registered data and inputted data representing the fingerprint with each other, referring to the form detected when the fingerprint is detected.

11. A recording medium according to claim 10, the method including registering the fingerprint data and form data representing the form, being correlated with each other.

12. A computer-readable recording medium storing a fingerprint authenticating program executed by a computer, the program causing the computer to perform a method, the method including:
- detecting a fingerprint by a fingerprint sensor unit in which a detection form of the fingerprint varies according to a relative position relationship with a finger;
- registering a plurality of sets of fingerprint data detected by the fingerprint sensor unit with the detection form;
- comparing comparison fingerprint data selected from the plurality of sets of registered fingerprint data with inputted fingerprint data detected by the fingerprint sensor unit, the comparison fingerprint data being corrected by a detection form of the inputted fingerprint data, or the inputted fingerprint data being corrected by a detection form of the comparison fingerprint data; and
- displaying a message representing reporting information for urging inputting of the fingerprint.

13. A computer-readable recording medium storing a fingerprint authenticating program executed by a computer, the program causing the computer to perform a method, the method including:
- detecting a fingerprint by a fingerprint sensor unit in which a detection form of the fingerprint varies according to a relative position relationship with a finger;
- judging whether or not fingerprint data representing the fingerprint detected by the fingerprint sensor unit with the detection form is normal;
- registering the fingerprint data judged to be normal; and
- comparing comparison fingerprint data selected from the registered fingerprint data with inputted fingerprint data detected by the fingerprint sensor unit, the comparison fingerprint data being corrected by a detection form of the inputted fingerprint data, or the inputted fingerprint data being corrected by a detection form of the comparison fingerprint data.

14. A portable terminal device comprising:
- a housing unit, a form of which varies differently;
- a fingerprint sensor unit that is installed in the housing unit and detects a fingerprint from a finger;
- a form detecting unit that detects the form of the housing unit when the fingerprint sensor unit detects the fingerprint from the finger;
- a registering unit that registers fingerprint data representing the fingerprint detected by the fingerprint sensor unit; and
- a comparing unit that compares registered data of the registering unit and inputted data obtained from the fingerprint sensor unit with each other, referring to the form detected when the fingerprint is detected.

15. A portable terminal device according to claim 14, wherein the fingerprint data and form data representing the form are registered in the registering unit, being correlated with each other.

16. A portable terminal device including:
- a fingerprint sensor unit in which a detection form of a fingerprint varies according to a relative position relationship with a finger;
- a registering unit that registers a plurality of sets of fingerprint data detected by the fingerprint sensor unit with the detection form;
- a comparing unit that compares comparison fingerprint data selected from the plurality of sets of fingerprint data registered in the registering unit with inputted fingerprint data detected by the fingerprint sensor unit, the comparison fingerprint data being corrected by a detection form of the inputted fingerprint data, or the inputted fingerprint data being corrected by a detection form of the comparison fingerprint data;
- a displaying unit that displays a message; and
- a processing unit that causes the displaying unit to display a message representing reporting information for urging inputting of a fingerprint to the fingerprint sensor unit, and causes the registering unit to register a plurality of sets of fingerprint data obtained from the fingerprint sensor unit.

17. A portable terminal device comprising:
- a fingerprint sensor unit in which a detection form of a fingerprint varies according to a relative position relationship with a finger;
- a processing unit that judges whether or not fingerprint data representing the fingerprint detected by the finger print sensor unit with the detection form is normal;
- a registering unit that registers the fingerprint data judged to be normal by the processing unit; and
- a comparing unit that compares comparison fingerprint data selected from the fingerprint data registered in the registering unit with inputted fingerprint data detected by the fingerprint sensor unit, the comparison fingerprint data being corrected by a detection form of the inputted fingerprint data, or the inputted fingerprint data being corrected by a detection form of the comparison fingerprint data.

* * * * *